United States Patent
Ranganathan et al.

(10) Patent No.: US 11,604,790 B2
(45) Date of Patent: Mar. 14, 2023

(54) CONVERSATIONAL INTERFACE FOR GENERATING AND EXECUTING CONTROLLED NATURAL LANGUAGE QUERIES ON A RELATIONAL DATABASE

(71) Applicant: Unscrambl Inc, Atlanta, GA (US)

(72) Inventors: Anand Ranganathan, Stamford, CT (US); Alim Sukrucan Gokkaya, Yozgat (TR); Benjamin Arar, New York, NY (US); Bugra Gedik, Kirkland, WA (US); Merter Sualp, Ankara (TR)

(73) Assignee: UNSCRAMBL INC, Atlanta, GA (US)

( * ) Notice: Subject to any disclaimer, the term of this patent is extended or adjusted under 35 U.S.C. 154(b) by 276 days.

(21) Appl. No.: 17/007,494

(22) Filed: Aug. 31, 2020

(65) Prior Publication Data
US 2022/0067037 A1    Mar. 3, 2022

(51) Int. Cl.
*G06F 16/242*        (2019.01)
*G06F 16/2453*       (2019.01)
(Continued)

(52) U.S. Cl.
CPC ............ *G06F 16/243* (2019.01); *G06F 3/167* (2013.01); *G06F 16/24539* (2019.01);
(Continued)

(58) Field of Classification Search
CPC ................ G06F 16/233; G06F 16/243; G06F 16/24539; G06F 3/167; G10L 15/22;
(Continued)

(56) References Cited

U.S. PATENT DOCUMENTS 5,924,089 A    7/1999 Mocek et al.
7,620,542 B2  11/2009 Sheu et al.
(Continued)

FOREIGN PATENT DOCUMENTS

EP    0 387 226    9/1990

OTHER PUBLICATIONS

Earley, "An Efficient Context-Free Parsing Algorithm", Computer Science Department, Carnesie-Mellon University, 1968, 145 pages.
"Context-Free Grammar—Wikipedia", retrieved from https://en.wikipedia.org/wiki/Context-free_grammar, Oct. 2001, Aug. 26, 2020, pp. 1-20.

*Primary Examiner* — Etienne P Leroux
(74) *Attorney, Agent, or Firm* — F. Chau & Associates, LLC

(57) ABSTRACT

A conversational analytics system may provide for a conversational interface to any relational database. A controlled natural language may be constructed in an automated manner from a given database (e.g., from schema and values associated with a relational database). For instance, a user natural language expression may be converted to an expression in the constructed controlled natural language and the controlled natural language expression may be converted into a sequence of one or more queries in a query language (e.g., queries in structured query language (SQL)). Such an intermediate controlled natural language may provide queries without ambiguity (e.g., as each expression or phrase in the controlled natural language may be mapped to one sequence of SQL queries). Accordingly, any natural language user utterance that ultimately follows the controlled natural language may be automatically converted into a sequence of one or more SQL queries sent to the database.

20 Claims, 10 Drawing Sheets

(51) Int. Cl.
  *G10L 15/22* (2006.01)
  *G06F 3/16* (2006.01)
  *G10L 15/18* (2013.01)
  *G10L 15/19* (2013.01)

(52) U.S. Cl.
  CPC .......... *G10L 15/1815* (2013.01); *G10L 15/19* (2013.01); *G10L 15/22* (2013.01); *G10L 2015/223* (2013.01)

(58) Field of Classification Search
  CPC ..... G10L 15/19; G10L 15/1815; G10L 15/26; G10L 2015/223
  See application file for complete search history.

(56) References Cited

U.S. PATENT DOCUMENTS

| | | |
|---|---|---|
| 7,917,497 B2 | 3/2011 | Harrison et al. |
| 8,996,555 B2 | 3/2015 | Kuchmann-Beauger et al. |
| 9,183,511 B2 | 11/2015 | Li et al. |
| 9,280,535 B2 | 3/2016 | Varma et al. |
| 9,652,451 B2 | 5/2017 | Elder |
| 10,037,368 B1 | 7/2018 | Nandyalam et al. |
| 10,235,358 B2 | 3/2019 | Tur et al. |
| 2015/0026153 A1 | 1/2015 | Gupta et al. |
| 2016/0179785 A1* | 6/2016 | Ashtiani ............ G06F 16/24522 704/9 |
| 2018/0039692 A1* | 2/2018 | Wang .................. G06F 16/2445 |
| 2018/0144065 A1* | 5/2018 | Yellai ................ G06F 16/90332 |
| 2020/0065377 A1* | 2/2020 | Hirzel .................... G10L 15/22 |

* cited by examiner

CONVERSATIONAL INTERFACE FOR GENERATING AND EXECUTING CONTROLLED NATURAL LANGUAGE QUERIES ON A RELATIONAL DATABASE

BACKGROUND

The following relates generally to database operation, and more specifically to database operation using natural language commands.

Databases may be implemented to manage and store information (e.g., data) in a structured manner. In some cases, a database (e.g., a relational database) may manage and store data based on a relational model in which data (e.g., entities) sharing the same attributes may be grouped into tables and relationships may be formed between different entities or tables. Such relational databases may also provide relational operators allowing for management and manipulation of data stored in tabular form.

In some examples, data may be accessed, managed, stored, etc. via queries into the database. For example, data in a relational database may be accessed using a structured query language (SQL) query (i.e., a query in a domain-specific language formulated for performing actions in the database). For instance, data stored in a relational database may be stored in a particular structure such that SQL queries may be formed with certain semantics in order to efficiently query the relational database.

In some cases, improved techniques for processing database queries may be desired for increased accessibility to data stored in such a database. Furthermore, attempts to access a database using natural language commands may fail because there is not an exact correspondence between natural language expressions and database queries. Therefore, there is a need in the art for improved systems and methods to operate a database using natural language commands.

SUMMARY

Embodiments of the present disclosure relate to operating a database with natural language commands. In some embodiments, natural language queries are converted into queries in a controlled natural language. The controlled natural language refers to a subset of a natural language that may be obtained by restricting the grammar and vocabulary to remove ambiguity and complexity. Accordingly, expressions in the controlled natural language have a one-to-one correspondence with a sequence of commands in a structured query language. In some embodiments, the controlled natural language may be generated based on the schema or contents of a specific database to enable interaction with that database.

Accordingly, a method, apparatus, and non-transitory computer readable medium for relational database operation are described. Embodiments of the method, apparatus, and non-transitory computer readable medium include receiving a natural language expression for querying a database, generating at least one query for the database in a query language based on the natural language expression and a controlled natural language, wherein the controlled natural language is automatically generated based on a schema and values of the database, and retrieving data from the database based on the at least one query.

A method, apparatus, and non-transitory computer readable medium for relational database operation are described. Embodiments of the method, apparatus, and non-transitory computer readable medium include identifying a model for a database, generating at least one context free grammar (CFG) based on the model, and constructing a controlled natural language based on the at least one CFG, wherein each expression of the controlled natural language can be mapped to a sequence of one or more queries in a query language.

An apparatus and system for relational database operation are described. Embodiments of the apparatus and system include a grammar builder configured to construct a controlled natural language based on a database model, a natural language understanding (NLU) engine configured to generate a controlled natural language expression based on the controlled natural language, and a query processor configured to generate a query for the database based on the controlled natural language expression.

DETAILED DESCRIPTION

Figure 1:
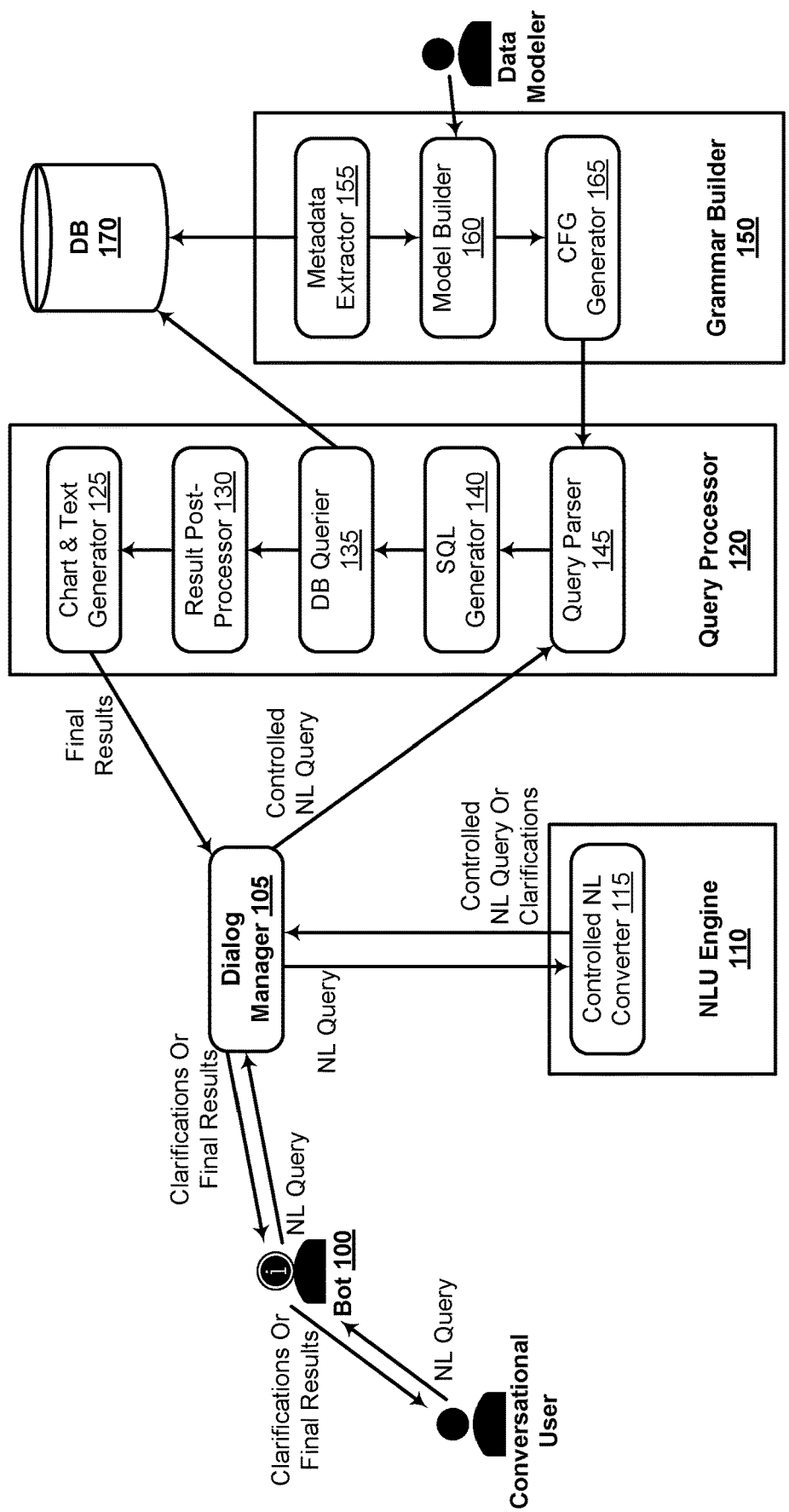
FIG. 1 shows an example of conversational analytics system according to aspects of the present disclosure.

Databases may be implemented to manage and store information (e.g., data) in a structured manner. In some cases, a database (e.g., a relational database) may manage and store data based on a relational model in which data sharing same attributes (e.g., certain entities) may be grouped into tables. However, relational databases may be difficult to query. For example, often relational databases may be queried (e.g., accessed, managed, maintained, etc.) using a query language, such as structured query language (SQL). Efficient usage of SQL queries may be associated with knowledge of SQL semantics, knowledge of the data model used in the database, knowledge of terms used in a database, etc. In some cases, such may result in inaccessibility to data stored in a database (e.g., due to inefficient or ineffective querying by non-technical users, users unfamiliar with relational databases, user unfamiliar with SQL, etc.).

In some cases, inaccessibility to data (e.g., inefficient operation of a relational database) may pose various organizational challenges. For instance, many organizations may store structured data in relational databases. Due to the nature of database models and query languages, only a limited number of users (e.g., data scientists) may be able to adopt and implement up-to-date intelligence tools, some data collected may not be fully used for decision making (e.g., by non-technical users), etc. Business intelligence tools provide users with access to pre-defined reports and dashboards. However, the intelligence tools may not answer ad-hoc queries received from a user. Information technology (IT) experts, data analysts, and data scientists may thus be used to answer ad-hoc questions to understand data, develop code to process the data, and present the analysis to the user. The process may be time consuming and may reduce productivity of the user (e.g., of a non-technical user). In other words, due to some database characteristics (e.g., such as queries using SQL) access to analytics content from insights, analytics, and data science platforms may be limited to technical users or specialists with varying degrees of analytical and technical skills (e.g., such as users or specialists with knowledge of relational databases, knowledge of SQL, etc.).

The techniques described herein may generally provide for improved querying of databases (e.g., such as conversational access to data stored in a relational database). For instance, conversational analytics may be implemented to provide a free-form approach to analytics which may help break the barriers to non-technical users that may be presented by insight tools including relational databases. As described in more detail herein, a conversational analytics system may provide for a conversational interface to (and from) a relational database. Embodiments of the present disclosure construct a controlled natural language in an automated manner from a given database.

For instance, a user natural language expression may be converted (e.g., mapped) to an expression in the constructed controlled natural language, and the controlled natural language expression may be converted into a sequence of one or more queries in a query language (e.g., such as SQL queries for databases with SQL interfaces). Such an intermediate controlled natural language may provide query translation (e.g., from natural language user input to query language database input) without ambiguity (e.g., as each expression or phrase in the controlled natural language may be mapped to one query in the query language, or a specific sequence of queries in the query language).

In some cases, a natural language expression may map to more than one controlled language expression and the conversational analytics system may iterate with the user to identify the desired expression in the controlled natural language (e.g., based on a set of options in the controlled natural language identified based on the natural language user input). Accordingly, any user utterance that ultimately follows the controlled natural language, either initially or after iteration with the conversational analytics system, may be automatically converted into a sequence of one or more queries in a query language sent to a database (e.g., such as one or more SQL queries). The results from the database may then be collected and presented to the user via the interface. Relational databases implementing one or more aspects of the techniques described herein may thus be effectively utilized by a wider range of users (e.g., including users without specific knowledge of relational databases, without certain knowledge of SQL, etc.).

FIG. 1 shows an example of conversational analytics system according to aspects of the present disclosure. The example shown includes bot 100, dialog manager 105, natural language understanding (NLU) engine 110, query processor 120, grammar builder 150, and database (DB) 170.

As described herein, conversational analytics represents a different approach to analyzing data with minimal or no training used. Simple, natural text or voice commands provide a free-form approach to analytics and can help circumvent barriers presented by insight tools (e.g., technical knowledge pre-requisites associated with some relational databases). Conversational analytics provides a user the ability to provide text or voice expressions of input data and receive output data (e.g., a natural language answer). A visual analysis of the statistically relevant and actionable data may also be provided. For example, a user in a retail company can ask a query such as "Which products sold best among women between the ages of 18-25 in Milan this week?" A response may be delivered in a combination of natural language text and charts that can be shared. The user can then drill-down to explore data further and receive more charts detailing the response.

A number of challenges may exist in processing natural language queries. For example, in some cases a conversational analytics system may not understand natural language (NL) queries from a user and may not correctly convert the queries into one or more structured queries to a database due to a wide variety of data and data sources that the conversational analytics system may handle. Additionally or alternatively, relational databases may not understand NL queries. Different databases may have different data schemas (e.g., different relational models, different data structures, etc.) and may store varying kinds of data. As a result, the same NL query may be deciphered differently, depending on how the data is modeled in the backend database.

Additionally, there may be a discrepancy between how a user expresses a query and how the data is stored in the database. The user may use different terms than what is used in the database or the user may ask for results that use certain transformations on the raw data. For example, a user may make an expression such as "Profit from Northeast region," but the database may not have information other than revenue and cost (from which profit can be calculated), and the database may have information at a state level, from where region information is derived.

Intelligence and analytical queries can be complex, with zero or more filters, aggregations, group-bys, sorting, joins and other operations applied to raw data. Complex conditions and operations of natural language create inherent ambiguities, providing difficulties to a user to understand an expected meaning of language. For example, in a natural language expression such as "what was the revenue in the last month", the phrase "in the last month" could be interpreted as in the last calendar month, or in the last 34) days. As another example, the expression "top 5 product sales," may be interpreted as "top 5 products ordered by total sales from all transactions" or the "total sales from the top 5 products" or the "top 5 transactions in order of the sales amount" or several other viable interpretations.

Another source of ambiguity is that there may be various definitions of the same term. For example, a term like "revenue" can mean "gross revenue," "net revenue," "net revenue before taxes," "net revenue before taxes in USD," etc. depending on the user or the context. A conversational system is described herein (e.g., via dialog manager 105, NLU engine 110, and/or bot 100) for users to ask queries such as "what is the revenue in the last month" may identify possible definitions and then express alternative definitions in a non-ambiguous manner back to the user. For instance, a user (e.g., a conversational user) may ask a question (e.g., make an expression in natural language) to a bot 100. The bot 100 (e.g., a chatbot, a UI, a microphone, etc.) may pass the NL query to a dialog manager 105. The dialog manager 105 may then pass the NL query to NLU engine 110. NLU engine 110, or controlled NL converter 115, may convert (e.g., map) the NL query to a controlled NL query or to one or more controlled NL query classifications in accordance with the techniques described herein (e.g., an identified controlled NL query may be passed on to query processor 120 or one or more controlled NL query classifications may be rerouted back to the bot 100 for further clarification from the conversational user).

Further, embodiments of the present disclosure relate to converting natural language to SQL in the context of a conversational analytics system using an intermediate controlled natural language. A controlled natural language may refer to a subset of a natural language obtained by restricting the grammar and vocabulary to reduce or eliminate ambiguity and complexity. Additionally or alternatively, embodiments of the present disclosure relate to converting an expression from natural language to an expression in controlled natural language and converting the expression in controlled natural language into a query for DB 170 (e.g., into a query in SQL). As used herein, the word "expression" may generally refer to a statement, query, question, sentence, term, phrase, etc. In other words, the techniques described herein (e.g., conversion of natural language to controlled natural language to SQL) may generally apply to any user utterance including expressions, statements, queries, sentences, questions, phrases, sounds, etc. that may be converted to controlled NL queries and ultimately converted into SQL queries. In some cases, expression may be used to refer to other forms of user input (e.g., such as text input). Moreover, while the present disclosure may refer to conversion of natural language to SQL, the techniques described herein may be implemented to map natural language to any other query language (e.g., any non-SQL backend may be used with a different mapping and backend model, and associated backend query generator).

An intermediate controlled natural language provides queries without ambiguity. Each expression in the controlled natural language can be mapped to one query language query, such as one SQL query, or a sequence of query language queries. The controlled natural language may also provide a space of queries that a database can answer. Controlled natural language can be generated based on characteristics of the database (e.g., including a schema and values). The controlled natural language may then clarify any ambiguities in the user's query. For example, if the user asks, "top 5 product sales", the conversational analytics system (e.g., NLU engine 110 and dialog manager 105) may return suggestions to the user expressed in the controlled natural language (e.g., expressed or output via bot 100). For example, the conversational analytics system may return "did you mean 'Top 5 products ordered by their total sales from all transactions' or 'total sales from the top 5 products' or 'top 5 transactions in order of the sales amount'." If the user picks a returned suggestion, the question may be answered by the database since the database may map each controlled natural language expression (e.g., each controlled NL query) to a unique SQL query.

The controlled natural language also facilitates auto-completions in the user interface. For example, as the user starts typing or uttering a query, the present disclosure may use a current input from the user and determine subsequent words that may be used after the current input, based on the controlled natural language, and recommend the subsequent words to the user. Hence, as the user types in a text box in the conversational interface, the conversational analytics system may recommend valid subsequent words that may be used to the user as a drop-down or drop-up menu. Additionally or alternatively, the user may utter a keyword and the analytics system may respond with options of controlled natural language expressions including or relating to any user uttered keywords.

The controlled natural language of the present disclosure may increase accessibility to a database, providing to a user, the ability to ask a subset of common queries in natural language. The eventual SQL query may be a variant as supported by the database holding the data (e.g., Oracle, SQL Server, MariaDB, PostGres, Impala, Presto, etc.) since each database model often supports its own dialect of SQL. However, standard ANSI SQL dialect may be used but the conversational system may be generating the appropriate dialect.

In some examples, a controlled natural language is based on one or more context free grammars (CFGs). A CFG is a formal grammar in which every production rule is of the form includes a single nonterminal symbol, and a string of terminals or nonterminals. A formal grammar is considered "context free" when the production rules can be applied regardless of the context of a nonterminal. In other words, no matter which symbols surround it, the first nonterminal can always be replaced by the string of terminals or nonterminals. Note that CFGs by themselves may be ambiguous. For example, the same expression can result in different parse trees from a CFG. To resolve possible ambiguities in an expression, rules may be used to determine which parse tree may be used. In some cases, the controlled natural language of the present disclosure be less expressive than SQL.

While the present disclosure describes conversion of natural language to SQL queries, the same approach can work for non-SQL queries and other data sources which may not be relational databases. For example, the same approach can be used for no-SQL databases, grammar building and logical query generation may be generated from querybot model (e.g., including bot 100, dialog manager 105, NLU engine 110, etc.), as the querybot model may be extended or adapted by analogy. In some cases, the mapping and the data storage model may be specific to the backend and may be used to form the logical query model to the backend query. While the present disclosure may generally refer to a SQL query language, a non-SQL backend may be used with a different mapping and backend model (e.g., and associated backend query generator).

Natural language processing (NLP) refers to techniques for programming computers to interpret natural language. In some cases, NLP tasks involve assigning annotation data such as grammatical information to words or phrases within a natural language expression. Different classes of machine-learning algorithms have been applied to NLP tasks. These algorithms may take a set of features generated from the natural language data as input. Some algorithms, such as decision trees, utilize hard if-then rules. Other systems use neural networks or statistical models which make soft, probabilistic decisions based on attaching real-valued weights to input features. These models can express the relative probability of multiple answers.

A database may store data in a structured format. A database may be structured as a single database, a distributed database, multiple distributed databases, or an emergency backup database. In some cases, a database controller may manage data storage and processing in a database. In some cases, a user interacts with database controller. In other cases, database controller may operate automatically without user interaction.

Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

An input device may be a computer mouse, keyboards, microphones, keypads, trackballs, and voice recognition devices. An input component may include any combination of devices that allow users to input information into a computing device, such as buttons, a keyboard, switches, and/or dials. In addition, the input component may include a touch-screen digitizer overlaid onto the display that can sense touch and interact with the display.

A controlled natural language is a natural language characterized by restricted grammar and vocabulary. Controlled natural languages can improve readability for human readers (e.g. non-native speakers) as well as enable reliable automatic analysis of the language. In some cases, a controlled natural language includes a formal syntax and semantics that can be mapped to an existing formal language, such as first-order logic. Thus, these languages can be used as knowledge representation languages, and writing of those languages can be supported by fully automatic consistency and redundancy checks, query answering, etc.

According to some embodiments, bot 100 may display data to a user using a graphical representation, natural language text, audible information, or any combination thereof. In some examples, bot 100 responds to the natural language expression based on the data using a chatbot application. Bot 100 is an example of, or includes aspects of, the corresponding element described with reference to FIG. 3.

According to some embodiments, dialog manager 105 prompts a user with the set of controlled language expressions. In some examples, dialog manager 105 receives selection input from the user, where the selection is based on the selection input. In some examples, dialog manager 105 receives audio information. In some examples, dialog manager 105 converts the audio information into the natural language expression using a speech-to-text converter. In some examples, dialog manager 105 receives a partial natural language expression. In some examples, dialog manager 105 provides an autocomplete suggestion based on the partial natural language expression and the controlled natural language, where the natural language expression is based on the autocomplete suggestion. According to some embodiments, dialog manager 105 may be configured to provide controlled natural language options from the NLU engine 110 to a user, where the controlled natural language expression is generated based on a selection among the controlled natural language options (e.g., the controlled natural language expression to be converted to the query in the query language may be based on a selection among controlled natural language options identified based on the user natural language expression). Dialog manager 105 is an example of, or includes aspects of, the corresponding element described with reference to FIG. 3.

According to some embodiments, NLU engine 110 receives a natural language expression for querying a database. In some examples, NLU engine 110 converts the natural language expression into the controlled natural language using a natural language understanding engine, where the at least one query is generated based on the converted natural language expression. In some examples, NLU engine 110 generates a set of controlled natural language expressions using the NLU engine 110. In some examples, NLU engine 110 selects one of the controlled natural language expressions, where converting the natural language expression is based on the selection. In some examples, NLU engine 110 identifies a prior query to the database, where the natural language expression is converted based on the prior query. In some examples, NLU engine 110 constructs the controlled natural language based on the at least one CFG, where each expression of the controlled natural language can be mapped to a sequence of one or more queries in a query language.

In some examples, the controlled natural language represents a set of operations including at least one operation from a set including a filter operation, an aggregation operation, a selection operation, a top K operation, a trend operation, and a comparison operation, where each of the operations is described by a base CFG fragment and is associated with a refinement CFG. According to some embodiments, NLU engine 110 may be configured to generate a controlled natural language expression based on the controlled natural language. NLU engine 110 is an example of, or includes aspects of, the corresponding element described with reference to FIG. 3. In one embodiment, NLU engine 110 includes controlled NL converter 115. Controlled NL converter 115 is an example of, or includes aspects of, the corresponding element described with reference to FIG. 3. In some examples, controlled NL converter 115 may perform one or more operations of NLU engine 110 described herein.

According to some embodiments, query processor 120 generates at least one query for the database in a query language based on the natural language expression and a controlled natural language, where the controlled natural language is automatically generated based on a schema and values of the database. In some examples, query processor 120 retrieves data from the database based on the at least one query. In some examples, the database includes a relational database and the query language includes a SQL query. According to some embodiments, query processor 120 constructs a controlled natural language based on the at least one CFG, where each expression of the controlled natural language can be mapped to a sequence of one or more queries in a query language.

According to some embodiments, query processor 120 may be configured to generate a query for the database based on the controlled natural language expression. In some examples, the query processor 120 further includes a query parser 145, a query generator, a database querier, and a result processor. Query processor 120 is an example of, or includes aspects of, the corresponding element described with reference to FIG. 3. In one embodiment, query processor 120 includes chart and text generator 125, result post-processor 130, DB querier 135, SQL generator 140, and query parser 145. Chart and text generator 125, result post-processor 130, DB querier 135, SQL generator 140, and query parser 145 may be examples of, or include aspects of, the corresponding elements described with reference to FIG. 3. In some examples, combinations of one or more of chart and text generator 125, result post-processor 130, DB querier 135, SQL generator 140, and query parser 145 may perform one or more aspects of operations performed by query processor 120 described herein.

According to some embodiments, DB querier 135 transmits the at least one query to the database, where the data is retrieved in response to transmitting the query.

According to some embodiments, grammar builder 150 generates at least one CFG based on the schema. According to some embodiments, grammar builder 150 identifies a model for a database. In some examples, grammar builder 150 generates at least one CFG based on the model. In some examples, grammar builder 150 identifies metadata for the database, where the metadata includes a schema and a set of database attributes. In some examples, grammar builder 150 extracts the model for the database based on the metadata. In some examples, grammar builder 150 identifies additional semantic information about the database.

Some embodiments of the present disclosure are configurable to bridge a semantic gap between a physical data model and a users' understanding of the domain. For example, the grammar builder 150 may enhance the model based on the additional semantic information, and the at least one CFG may be generated based on the enhanced model. For instance, in some cases semantic information may be identified and the model may be enhanced using inputs from a conversational user, a data modeler, or both. In some examples, the at least one CFG includes a base CFG and a set of refinement CFGs, where the base CFG includes a modular structure including a set of CFG fragments, and where each of the CFG fragments describes an operation, and is associated with parsing logic and one of the refinement CFGs. In some examples, each of the CFG fragments (e.g., each CFG fragment that is part of the base CFG) includes a single entry non-terminal and zero or more exit non-terminals.

In some examples, grammar builder 150 identifies an empty CFG and identifies an Entity-Relationship (ER) model including a set of entities and a set of relations between the entities. Then, grammar builder 150 generates an entity CFG fragment for each of the entities using an entity recognizer, where the entity CFG fragment includes a CFG fragment corresponding to each operation on an entity. The grammar builder 150 adds the entity CFG fragment to the grammar. Then, grammar builder 150 generates a relation CFG fragment for each relation among the entities and adds the relation CFG fragment to the grammar, where the at least one CFG is based on the empty CFG, the added entity CFG fragment, and the added relation CFG fragment. In some examples, grammar builder 150 identifies a set of string values from the database, where the at least one CFG is generated based on the string values.

An example of a process for generating a CFG is described below in Algorithm 1:

| Algorithm 1 |
| --- |
| a. Start with an empty grammar, G |
| b. For each entity e in an ER Model that contains a set of attributes A(e),  |
|   i. For each single entity recognizer z |
|     1. Generate grammar snippet, g, for z(e, A(e)) |
|     2. If z is a string filter recognizer, |
|       a. Obtain specific values V of the attribute a from the database |
|       b. Include these values in g |
|     3. Add g to G |
| c. For-each relation r between e1 and e2 based on attributes a1 and a2 in the ER Model, |
|   i. For each relational recognizer z |
|     1. Generate grammar snippet, g, for z(r, e1, e2, a1, a2) |
|     2. Add g to G |
| d. Return G |

According to some embodiments, grammar builder 150 may be configured to construct a controlled natural language based on a database model. In some examples, the grammar builder 150 further includes a metadata extractor 155 configured to extract metadata for the database, a model builder 160 configured to generate a model of the database based on the metadata, and a CFG generator 165 configured to construct the controlled natural language based on the model.

Grammar builder 150 is an example of, or includes aspects of, the corresponding element described with reference to FIG. 3. In one embodiment, grammar builder 150 includes metadata extractor 155, model builder 160, and CFG generator 165. Metadata extractor 155, model builder 160, and CFG generator 165 may be examples of, or include aspects of, the corresponding elements described with reference to FIG. 3. In some embodiments, a combination of one or more of metadata extractor 155, model builder 160, and CFG generator 165 may perform one or more aspects of operations performed by grammar builder 150 described herein.

DB 170 is an example of, or includes aspects of, the corresponding element described with reference to FIG. 3. As described herein, generating a conversational interface that uses controlled natural language for asking questions on a database has several challenges. The conversational analytics system described herein (e.g., the conversational analytics systems described in FIGS. 1 and 3) may be used to simplify deployment and management and/or retain the data as-is in the database (e.g., in DB 170). Each controlled NL query is converted into a sequence of SQL queries that can go against the database in a live manner and get back fresh answers. An alternative approach may be to extract some or all of the dataset from the database into an intermediary storage with a pre-defined format.

The data may remain in the database and the conversational analytics system may use different database schemas and content. The conversational analytics system may convert the controlled NL query into a specific query (or queries) supported by a backend database (e.g., such as DB 170 which may support, for example, a SQL interface). The conversational analytics system described herein may support automated generation of the controlled natural language and evaluation of expressions in the controlled natural language (e.g., evaluation of NL queries in the controlled natural language). In some cases, each database may use a different controlled natural language (e.g., as each database may have a unique schema, different values, and different semantics). Hence, automated generation of the controlled natural language may be used to minimize the human effort involved in bringing up a conversational system for any new backend database.

Conversations are inherently contextual where each expression is interpreted in the context of previous expressions. Similarly, the conversational analytics system may refine previous queries and explores a chain of thought or investigation. For example, a user can follow up a question such as "what was the revenue in the last month" with a drill-down question such as "show it by region and by product type." The conversational analytics system may then interpret the drill-down question in the context of the previous question.

In some examples, a single controlled NL query may use a sequence of SQL queries to collect relevant results. For example, a query such as "compare sales in January 2020 vs December 2019" may use several queries to calculate total sales, sales by different products, and sales by different geographies to present a consolidated comparison to the user. As a result, a single NL query may be converted into a sequence of one or more SQL queries.

The following is an example process (e.g., that may be implemented within the example conversational analytics system of FIG. 1) to generate a conversational analytics interface (e.g., via bot 100) based on the controlled natural language of the present disclosure. A model of the DB 170 may be extracted, including the schema and values from the DB 170 (e.g., where schema, values, etc. of a database may generally include any information about a database or database entity such as information about attribute fields, relationships amongst attribute fields, values of attribute fields, etc., as described in more detail herein, for example, with reference to FIGS. 2 and 5). In some cases, the model may be enhanced with additional semantic information. A controlled natural language may be generated, in the form of a context-free grammar, that expresses the space of possible queries on the database.

In some cases, a conversational analytics system may translate any NL query, automatically, from a conversational user on a chat interface to a controlled NL query that satisfies the context-free grammar. The controlled NL query may then be translated (e.g., automatically) into a sequence of one or more SQL queries against the DB 170 in a context and conversational specific manner. In some examples, additional processing may be performed on the results. The results of the query may be output to the user (e.g., via a display, via a speaker, etc.).

In some cases, the first three steps (e.g., extraction of database model information, enhancement of the model with additional semantic information, and generation of a controlled natural language) may occur during an initial set up of the DB 170, or when the conversational analytics system is refreshed to take into account any changes in the database schema or database content or when a data modeler makes changes to the model. In some cases, remaining steps may happen at query-time (e.g., When the user submits a query to the conversational analytics system).

The present disclosure describes conversion of natural language to SQL queries, and the same sequence may be used for non-SQL queries and other data sources that may not be relational databases. The techniques described herein may be extended to other applications by analogy without departing from the scope of the present disclosure.

In the example of FIG. 1, an example overall architecture of a conversational analytics system (e.g., a relational database combined with a conversational analytics system) is described. The example conversational analytics system may include bot 100, dialog manager 105, NLU engine 110, query processor 120, grammar builder 150, and DB 170.

Bot 100 may act as an interface between a conversational user and the conversational analytics system. Bot 100 may run on a conversational platform. Example platforms may include Slack, Microsoft Teams, Google Hangouts and other custom applications. Bot 100 may receive NL query utterances from conversational users and may sends the conversational analytics system the NL queries and receives clarifications or results. Bot 100 may then output or show the clarifications or results to the user. For instance, if the NL query is convertible to a controlled NL query without clarification, the NL query may be converted and the conversational analytics system may send the controlled NL query to query processor 120 for conversion to SQL (e.g., and results from DB 170 may be output back to the user). If the NL query results in desired clarifications in the space of controlled NL queries (e.g., if the NL query may correspond to one or more controlled NL queries), the conversational analytics system may identify a set of possible controlled NL queries and the conversational analytics system may prompt the user for clarifying information. As used herein, a conversational analytics system may generally refer to any combination of one or more of bot 100, dialog manager 105, and NLU engine 110.

Dialog manager 105 may manages the dialog with the conversational user and may receive a NL query from the user (e.g., via bot 100). Dialog manager 105 may determine if the NL query is a valid query (e.g., if the NL query is defined within the controlled natural language, if the NL query unambiguously convers to a controlled NL query, etc.). If the query is a valid query, dialog manager 105 may send the query (e.g., the controlled NL query) to query processor 120 to evaluate the query (e.g., to convert the controlled NL query to a SQL query). If the query is not a valid query, then dialog manager 105 may send the query to NLU engine 110 to convert the NL query into a valid controlled NL query.

NLU engine 110 may (e.g., in cases where the NL query is not valid or is not determined to be defined in the controlled natural language by dialog manager 105) receive a NL query along with information about the state of the dialog and the user history. NLU engine 110 may attempt to translate the NL query into a controlled NL query (e.g., given the context of the dialog and the user profile). NLU engine 110 may translate the NL query to a unique controlled NL query. In this case, NLU engine 110 may send the query back to dialog manager 105, and dialog manager 105 may then send the translated query to query processor 120 for executing against DB 170 (e.g., and then dialog manager 105 may receive a result to be passed back to the user).

In some cases, NLU engine 110 may also find possible controlled NL query translations (e.g., NLU engine 110 may also determine the NL query is not valid or is not determined to be defined in the controlled natural language). In this case, NLU engine 110 may determine a set of possible candidates for clarification and may send the possibilities as clarifications to dialog manager 105. In such cases, dialog manager 105 can present alternative controlled NL query translations, additional questions or requests for additional information, etc. to the user via Bot 100. When the user picks an alternative controlled NL query translation, dialog manager 105 may then send the controlled NL query to query processor 120 (e.g., or in some cases back to NLU engine 110).

In some cases, NLU engine 110 may find no translation. In this case, NLU engine 110 may report a failure to dialog manager 105, and dialog manager 105 may informs the user of an error (e.g., which may prompt the user to attempt an alternate NL query). In some cases, NLU engine 110 may then ask the user to reframe the question, NLU engine 110 may provide the user with a set of keywords or options, etc.

In some examples, query processor 120 may have a query parser 145, an SQL generator 140, a database querier (e.g., DB querier 135), a result post-processor 130, and a chart and text generator 125. The query parser 145 may be input with a controlled NL query from the user. The query may be parsed to generate a syntactic parse tree. The query parser 145 may then traverse different parts of the parse tree to extract parameters of the query and construct a logical query. The logical query may include a generic way of expressing a query independent of the specific dialect of SQL understood by the DB 170. The SQL generator 140 may take the logical query and generates a sequence of one or more SQL queries that can be understood by the DB 170. The DB querier 135 may maintain a connection to the DB 170 and sends the queries from the SQL generator 140 to DB 170 and DB querier 135 may collect the results of these queries if any. The result post-processor 130 may further process the results from the DB 170, clean up the results, apply additional analysis, etc. The chart and text generator 125 may use the post-processed results and generate output (e.g., such as one or more graphical widgets to display results). Such output (e.g., generated widgets) may include text boxes, charts of different kinds (such as bar charts, line charts, or Sankey charts), maps (such as heat maps, bubble maps, or choropleth maps), or the like (e.g., the present disclosure is not limited to such widgets).

In some examples, grammar builder 150 may include a metadata extractor 155, a model builder 160, and a CFG generator 165. The metadata extractor 155 may extract an initial model of the relational database (e.g., DB 170), including the schema and values of various attributes. In some cases, the model builder 160 may be used by a data modeler to further enhance the model with additional semantic information. The model builder 160 may expose a graphical user interface (GUI), or command line or text interfaces for the data modeler to supply this additional semantic information. The CFG generator 165 may use the semantic model of the DB 170 to generate multiple context free grammars that together describe the controlled natural language that represents possible queries the conversational analytics system can understand and query the DB 170 to get results.

Figure 2:
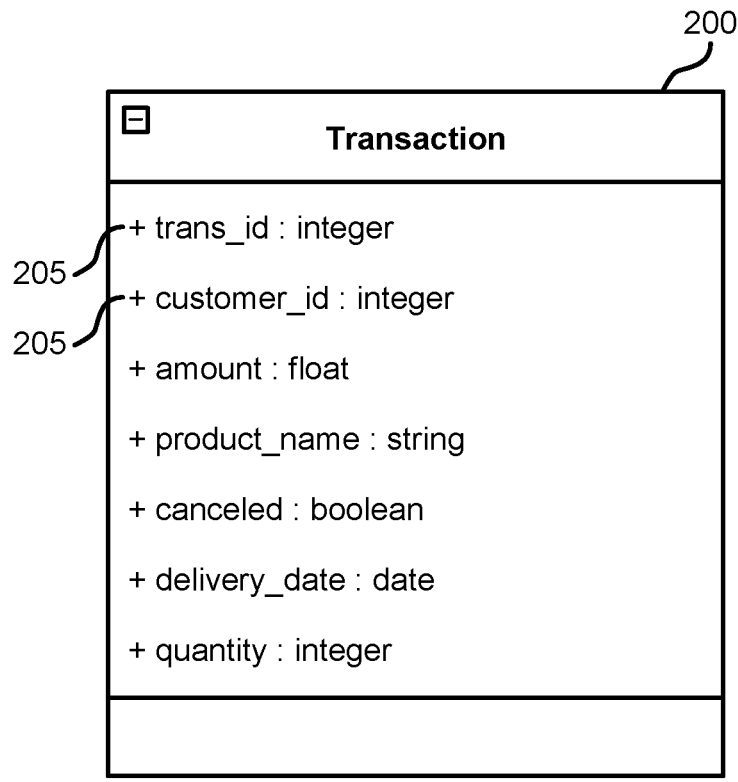
FIG. 2 shows an example of schema diagram according to aspects of the present disclosure.

FIG. 2 shows an example of schema diagram according to aspects of the present disclosure. A database may generally structure data according to various techniques. For example, in some cases, a database may structure data or information into one or more entities (e.g., such as transaction entity 200). A database entity may be associated with a certain data structure or data category, and each database entity may include one or more attribute fields 205. Accordingly, a database may store or structure data in tabular form (e.g., as a collection of entities, with each entity including attribute fields, such as a set of rows and columns). Relations between entities may be established via relations between one or more attribute fields 205 within respective entities. Accordingly, database schema may include how entities and attribute fields 205 are structured, named, etc., how relations between entities and attribute fields 205 are established, what relational operators are provided, etc.

For example, FIG. 2 may illustrate transaction entity 200. Transaction entity 200 is an example of, or includes aspects of, the corresponding element described with reference to FIG. 5. In one embodiment, transaction entity 200 includes attribute fields 205. Attribute fields 205 is an example of, or includes aspects of, the corresponding element described with reference to FIG. 5. For instance, transaction entity 200 may include, for example, 7 attribute fields 205 (e.g., the attribute fields 205 including+trans_id:integer, +custom- er_id:integer, +amount:float, +product_name:string, +canceled:Boolean, +delivery_date:date, and +quantity:integer). FIG. 2 may illustrate one or more aspects of controlled natural language design techniques described herein.

A controlled natural language may refer to a subset of a natural language obtained by restricting the grammar and vocabulary to reduce or eliminate ambiguity and complexity. The controlled natural language of the present disclosure may be non-ambiguous where each expression in the controlled natural language can be translated to an expression or sequence of expressions in SQL or any other query language. In some embodiments, there is no expression in the controlled natural language that cannot be translated to one sequence of valid expressions in SQL. Additionally, or alternatively, the controlled natural language of the present disclosure may support recursion, providing enough expressive power to construct SQL queries in a recursive manner from base constructs like selections, filters, and aggregations. The controlled natural language of the present disclosure may also be parse-able, where an expression may be determined to belong to the controlled natural language.

In the present disclosure, a controlled natural language may be represented as one or more CFGs. A CFG is made up of a set of productions of the form A→α, where A is a non-terminal and α is a string of terminals or non-terminals. CFGs may support recursion and may be parse-able. Even though CFGs may be ambiguous, the ambiguity can be resolved using certain prioritization mechanisms. In the conversational analytics system of the present disclosure, a CFG may be generated automatically from a database schema.

For example, a database may include an example schema in accordance with aspects of the FIG. 2 schema diagram. In an example scenario with 7 fields, there is a possible portion of a context free grammar that can describe certain kinds of aggregation queries. Table 1 below shows an example snippet of a base CFG. This base CFG may represent the set of aggregation questions that a user can ask on a transaction entity. If a user asks a question from this CFG, the user can further refine the question with another question from a specific refinement CFG.

TABLE 1

Agg_transaction -> AggPhrase_transaction | AggPhrase_transaction GroupByClause_transaction
AggPhrase_transaction ->
Agg_Attributes_transaction 'of the' SelectionWithOptionalFilters_trans
SelectionWithOptionalFilters_transaction -> 'transactions'
Agg_Attributes_transaction -> Agg_Attribute_trans
Agg_Attributes_transaction -> Agg_Attribute_transaction 'and' Agg_Attributes_trans
Agg_Attribute_transaction -> SummationAggFunction SummableAttribute_transaction
Agg_Attribute_transaction -> ComparisonAggFunction ComparableAttribute_transaction
Agg_Attribute_transaction -> 'number of unique' CountableAttribute_transaction 'values'
Agg_Attribute_transaction -> 'total number'
GroupByClause_transaction -> GroupBy_trans
GroupByClause_transaction -> GroupBy_transaction 'and' GroupByClause_transaction
GroupBy_transaction -> 'by' GroupByAttribute_trans
SummationAggFunction -> 'average' | 'total'
ComparisonAggFunction -> 'maximum' | 'minimum'
SummableAttribute_transaction -> 'amount' | 'quantity'
CountableAttribute_transaction -> 'product name' | 'amount' | 'customer_id' | 'quantity' | 'trans_id' | 'delivery_date'
ComparableAttribute_transaction -> 'amount' | 'customer_id' | 'trans_id' | 'product_name'
GroupByAttribute_transaction -> 'canceled' | 'customer_id' | 'delivery_date'| 'product_name'

Accordingly, the CFG can express queries with a "total amount of the transactions", a "total amount and average quantity of the transactions", or a "total number and number of unique values of product_name" and "total amount and maximum product_name of the transactions by delivery_ date and by customer_id". The CFG may be customized to the schema of the database. Information about the tables, attributes, relationships, and values may be used to construct the CFG (e.g., in the present example, information about transaction entity 200 such as information about attribute fields 205, relationships amongst attribute fields 205, values of attribute fields 205, etc. may be used to construct the CFG). In some examples, there are also relationships with other entities as described with reference to FIG. 5. For example, string attributes can be used as group-bys. Numeric attributes can be aggregated using functions such as a sum, average and standard deviation. Other information like primary keys, foreign keys and other information are also used to customize the CFG.

Note that the controlled natural language may not allow expressing invalid SQL queries. For example, it may not allow a query like "total amount of the customers" which is invalid, since this schema does not associate amount customers. Also, it may not allow query like "average product_name of the transactions", since product_name is of string type, and it doesn't make sense to calculate an average on it.

adding filters. If the first question is a top-k question, then the refinement might include changing the order-by clause. The refinements may depend on the specific entity (or entities) that the base question is about. For example, if the first question is an aggregation on a transaction entity, the possible refinements are different from refinements if the first question was an aggregation on a customer entity. Embodiments of the present disclosure may have several refinement CFGs depending on the kind of initial question and the entity the question.

Table 2 below shows an example snippet from a refinement CFG. The refinement CFG may provide for refining a question from the base CFG such as "total amount of the transactions" with a sequence of refinement questions such as, "refine and also show the maximum quantity and minimum quantity," "refine and only group by delivery date," or "refine and further group by customer id." The refinement CFG reuses several non-terminals from the base CFG like GroupByClause_transaction. For brevity, the expansions of these CFGs are not shown.

TABLE 2

| |
|---|
| AggregationRefinementQuery -> 'Refine and' EntityAggRefinement_transaction |
| EntityAggRefinement_transaction -> AggregateRefinement_transaction |
| EntityAggRefinement_transaction -> GroupByRefinement_transaction |
| AggregateRefinement_transaction_aggregation -> 'also show the' AggregatedAttributes_transaction |
| AggregateRefinement_transaction_aggregation -> 'only show the' AggregatedAttributes_transaction |
| GroupByRefinement_transaction_aggregation -> 'further group' GroupByClause_transaction |
| GroupByRefinement_transaction_aggregation -> 'only group' Group ByClause_transaction |

Thus, in some embodiments, there is no expression in the controlled natural language that cannot be translated to one sequence of valid expressions in SQL based on the given schema.

The controlled natural language and the associated CFG may use non-terminals to express components of the query. For example, Agg_Attributes_transaction and GroupByClause_transaction represent the aggregation functions and the group by clauses respectively. Similarly, SelectionWithOptionalFilters_transaction represents the Transaction entity with optional filters. For brevity, all possible productions of SelectionWithOptionalFilters_transaction non-terminal are not provided. However, in the complete grammar, the non-terminal would be associated with other productions that describe all possible ways of filtering transactions.

The controlled natural language and the associated CFG may also use recursion for lists of expressions. For example, the Agg_Attributes_transaction non-terminal has a recursive definition and can parse a phrase, such as "total number and number of unique values of product_name and total amount."

FIG. 2 may also illustrate one or more aspects of handling contextual refinements through multiple CFGs. For instance, as described herein, the conversational analytics system may refine queries and explore a chain of thought or investigation. As discussed, a CFG can express the possible queries a user can ask to start a conversation with a bot. To support refinements to the first question a user asks, the definition of the controlled natural language is extended to include a single base CFG and several refinement CFGs.

The base CFG represents a set of questions a user can ask when the user starts a chain of thought. Depending on this first question, several refinement questions are possible. For example, if the first question is an aggregation question, the refinements can include changing the group by attributes or FIG. 3 shows an example of conversational analytics system according to aspects of the present disclosure. The example shown includes bot 300, dialog manager 315, NLU engine 320, query processor 330, grammar builder 360, and DB 380.

Bot 300, dialog manager 315, NLU engine 320, query processor 330, grammar builder 360, and DB 380 may be examples of, or include aspects of, the corresponding elements described with reference to FIG. 1. In one embodiment, bot 300 includes text to speech converter 305 and speech to text converter 310. In one embodiment, NLU engine 320 includes controlled NL converter 325. Controlled NL converter 325 is an example of, or includes aspects of, the corresponding element described with reference to FIG. 1. In one embodiment, query processor 330 includes chart and text generator 335, result post-processor 340, DB querier 345, SQL generator 350, and query parser 355. Chart and text generator 335, result post-processor 340, DB querier 345, SQL generator 350, and query parser 355 are examples of, or include aspects of, the corresponding elements described with reference to FIG. 1. In one embodiment, grammar builder 360 includes metadata extractor 365, model builder 370, and CFG generator 375. Metadata extractor 365, model builder 370, and CFG generator 375 may be examples of, or include aspects of, the corresponding element described with reference to FIG. 1. DB 380 is an example of, or includes aspects of, the corresponding element described with reference to FIG. 1.

Figure 3:
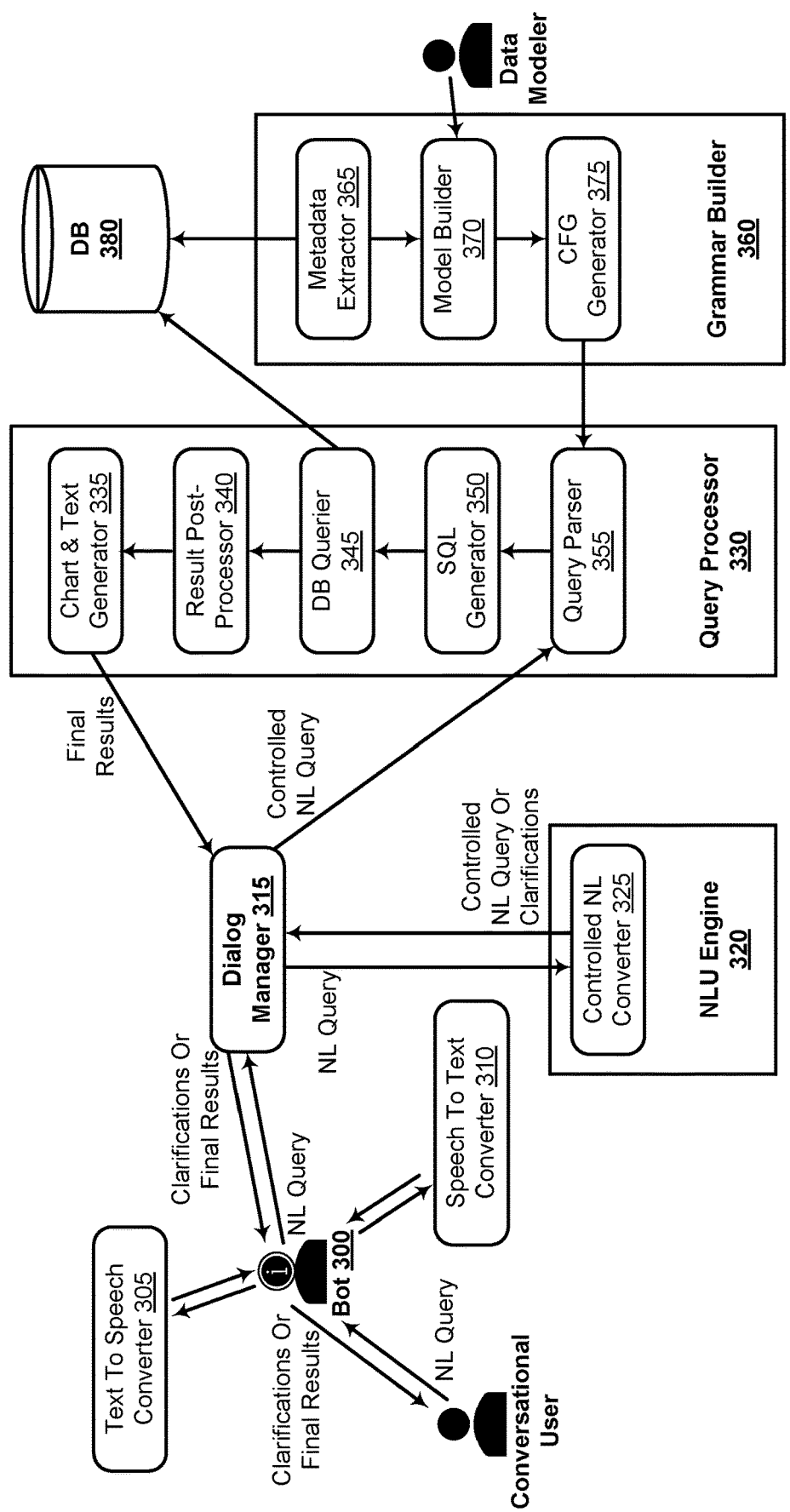
FIG. 3 shows an example of conversational analytics system according to aspects of the present disclosure.

For instance, FIG. 3 may illustrate an extension to the example conversational analytics system described in FIG. 1. For instance, the example conversational analytics system of FIG. 3 may illustrate how the conversational analytics system may be extended to support voice queries in addition to text queries. Bot 300 may include (e.g., or have access to, utilize, etc.) text to speech converter 305 and speech to text converter 310. Voice queries may be sent to a speech to text converter 310, converting the query to text. In other words, bot 300 may receive audio information (e.g., a natural language query uttered by a conversational user) and the bot may convert the audio information into a natural language expression using speech to text converter 310. The query may then be processed, and textual results may be converted to speech (e.g., via text to speech converter 305). The result may be a combination of voice, text and charts sent to the end user.

The grammar builder 360 may generally build a CFG for the controlled natural language based on the relational DB 170 as well as inputs from a data modeler. As described herein, controlled natural language (e.g., CFGs, controlled NL queries, etc.) may be built based on extracting a model of a database based on database information such as schema, values, etc. Grammar builder 360 may extract a model of the database (e.g., DB 380) containing the schema of the database, as well the unique values present in various columns. The model of the database may be an entity-relationship model. Entities correspond to tables in the database, attributes correspond to columns, and relationships correspond to foreign key relations.

The schema provides information about the tables, columns, and datatypes of the columns and provides information about characteristics such as primary and foreign keys. Furthermore, a grammar builder may extract information about the unique values present in string column types. The string values are used to evaluate queries with filters. For example, the conversational analytics system might extract the unique values of a "product name" column such as "apple", "banana", and "orange". Extracting the unique values may provide the conversational analytics system with an ability to interpret expressions (e.g., questions) such as "what is the total number of transactions with product name apple."

A final output of the database model extraction may be referred to as, for example, Querybot Entity-Relationship (ER) Model. This model may include names of the entities, names of the attributes in each entity, unique values of the string attributes for each entity, and primary key and foreign key information for each entity.

As described, in some examples, a model may be enhanced with additional semantic information. For instance, a human data architect or data modeler may enhance the Querybot ER Model of the database extracted in with additional semantic information, bridging the gap between the way a user asks questions and how the data is available in the database. The Querybot ER Model may include additional semantic information such as user friendly names of tables and columns, semantic tags for columns, additional properties of the table, additional synonyms of table names, column names and values, additional attributes that may be derived from existing attributes, metrics, defined as aggregations of one or more attributes, primary keys, foreign keys and other relationships with other entities, and value substitutions, among other examples. For instance, a value substitution may be defined for a database table that has a column called "gender" with values 1 and 2, where 1 represents Male and 2 represents Female. The user may not understand "1" or "2" in the context of gender, and hence the values may be substituted by words when results are shown to the user.

Additionally, or alternatively, a database may contain an attribute called "pn," but a data modeler may rename the attribute to a more understandable name such as "product name". In some cases, a semantic tag for a column may be to tag float attributes as representing monetary amounts or percentages, or tag string attributes as representing locations. Additional properties of the table may be default attributes for sorting or for applying date-time filters and groupings. For example, "amount" can be defined as the default attribute to use for sorting, for queries such as "what are the top 5 transactions."

For example, a portion of an enhanced querybot ER model might describe the "Transaction" table. An "amount" is associated with a "Currency" type, which means that the controlled natural language may recognize queries such as "what are the transactions with amount greater than $100." The enhanced querybot ER model may define a new derived attribute called "amount per unit quantity" which may be obtained by dividing amount by quantity and may define synonyms for various attributes. For example, defining "amt" as a synonym of "amount" implies that the controlled natural language accepts queries like "what are the transactions with amt greater than $100." The enhanced querybot ER model may also define a metric called "ARPU", which may be calculated as the sum of amount divided by the number of distinct customers and can be used in the controlled natural language in queries such as "what is the minimum ARPU and average ARPU and maximum ARPU from the transactions." The enhanced querybot ER model may also define a "naturalOrderAttributeName" as "amount" which means that a query such as "What are the top 5 transactions" should use the "amount" attribute for ordering. The enhanced querybot ER model may also define a "defaultTemporalAuributeName" as "delivery date", which means that queries such as "what is the gross volume of the transactions daily," may use a delivery date attribute to determine which day each transaction occurs. An example illustrating one or more aspects of the process described above is included below in Table 3.

TABLE 3

```
{
  "attributes": [
    {
      "name": "amount",
      "synonyms": {["amt","volume"]},
      "type": "Currency"
    },
    {
      "derivedAttributeExpression": "amount / quantity",
      "name": "amount per unit quantity",
      "type": "Currency"
    },
    {
      "name": "customer id",
      "type": "Integer"
    },
    {
      "name": "delivery date",
      "type": "Date"
    },
    {
      "name": "quantity",
      "synonyms": {["qty"]},
      "type"; "Integer"
    },
    ....
  ],
  "defaultTemporalAttributeName": "delivery date",
  "name": "transaction",
  "namedAggregates": [
    {
      "aggregatedAttribute": {
        "aggregationFunction": "Sum",
        "attributeName": "amount",
        "normalizer": {
```

TABLE 3-continued

```
        "aggregatedAttribute": {
            "aggregationFunction": "DistinctCount",
            "attributeName": "customer id"
        }
    }
},
    "phrase": "ARPU"
},
{
    "aggregatedAttribute": {
        "aggregationFunction": "Sum",
        "attributeName": "amount"
    },
    "phrase": "gross amount"
},
],
"naturalOrderAttributeName": "amount",
"primaryKeyAttributeNames": ["id"],
}
```

One or more aspects of the described techniques may also provide for generation of controlled natural language CFGs. As described, the conversational analytics system uses the model of the database with the extracted schema and values, enhanced by a user (e.g., a data modeler), and generates CFGs in an automated fashion. Additionally, or alternatively, the conversational analytics system may generate one or more base CFGs and several refinement CFGs.

The base CFG may have a modular structure, with different fragments of the CFG describing expressions or phrases for different kinds of operations. For example, a query fragment describing aggregation questions for the transaction entity (e.g., transaction entity 200 and/or transaction entity 500 described with reference to FIGS. 2 and 5) may be asked. Similarly, there may be separate fragments for describing aggregation questions on other entities. Additionally, or alternatively, there may be other fragments for defining other operations like selections and trends on each entity.

Each fragment of a CFG may have a single entry non-terminal and zero or more exit non-terminals. For example, a CFG fragment may have an entry non-terminal Agg_transaction. The entry non-terminal (e.g., Agg_transaction) may be the starting point for phrases about aggregations on the transaction entity. In some examples, the CFG fragment may also have one exit non-terminal (e.g., SelectionWithOptionalFilters_trans). For example, SelectionWithOptionalFilters_trans may be the entry non-terminal for a different CFG fragment to describe phrases related to the selection of one or more attributes with optional filters from a transaction table.

Creating a single CFG from a database schema may use recognizes. For instance, a recognizer (e.g., a software module) may take an entity definition as input in the querybot ER model, and the recognizer may output a base CFG fragment, associated logic to the base CFG fragment, a refinement CFG, and associated logic to the refinement CFG. The base CFG fragment may have a single "entry" non-terminal, and zero or more exit non-terminals. Logic associated with the base CFG fragment may parse a sentence in the base CFG fragment and extract relevant parameters to construct a SQL query. The refinement CFG may describe follow-up questions to be asked. Logic associated with the refinement CFG may parse a sentence in the refinement CFG fragment and collect additional parameters to construct a SQL query that follows-up from an executed query. Example schema and one or more aspects for generation of controlled natural language CFGs using such example schema is described in more detail herein, for example, with reference to FIG. 5.

Figure 4:
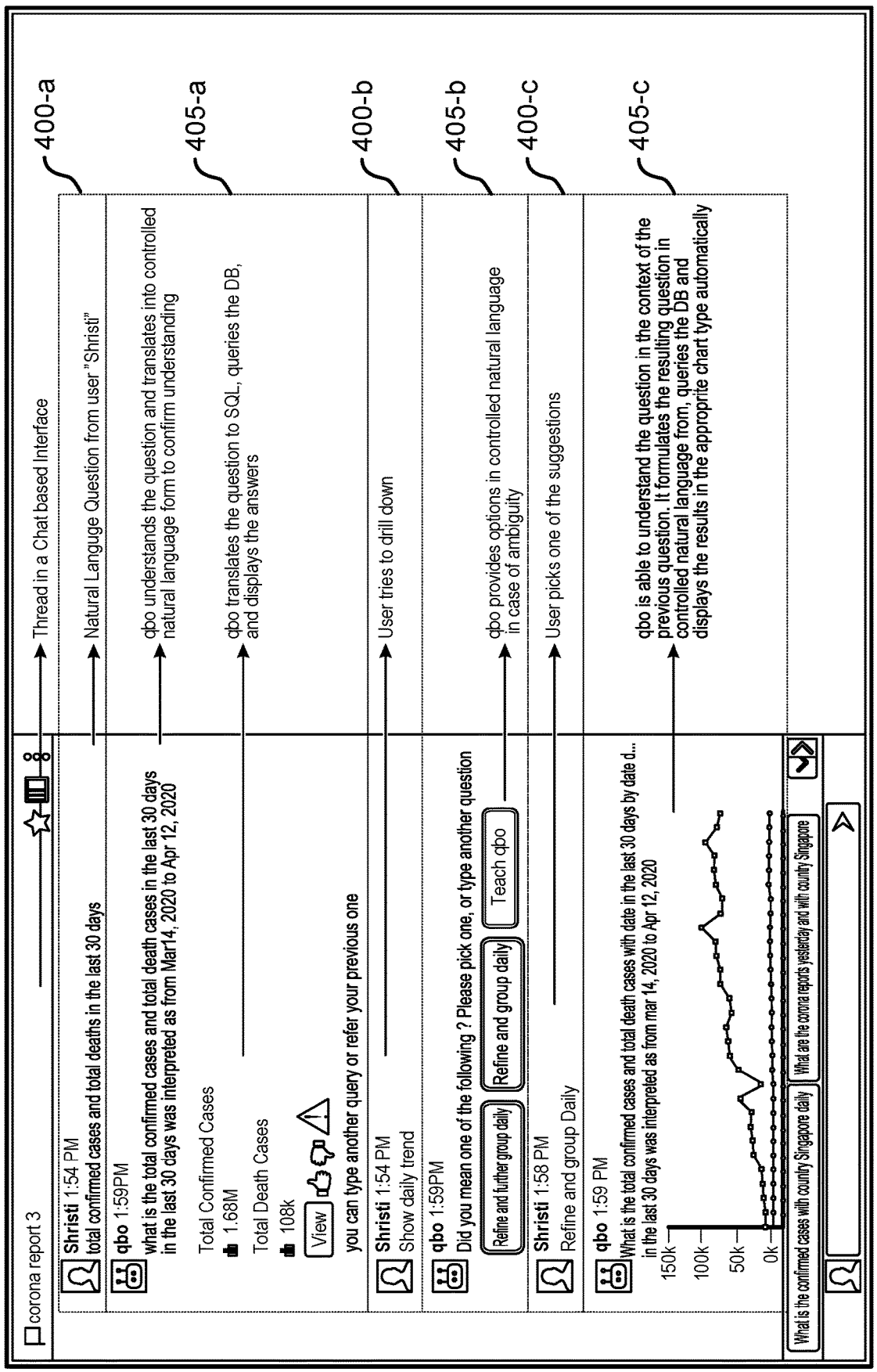
FIG. 4 shows an example of user interface (UI) diagram according to aspects of the present disclosure.

FIG. 4 shows an example of UI diagram according to aspects of the present disclosure. The example shown includes user input 400 (e.g., user input 400-a, user input 400-b, and user input 400-c) and bot output 405 (e.g., bot output 405-a, bot output 405-b, and bot output 405-c). FIG. 4 is shown for illustrative purposes only. As described herein, user input 400 may be collected in various forms (e.g., as audio or speech data, as text input, etc.) and bot output 405 may be provided in various forms (e.g., as image or display data, as audio or speech output data, as text output, etc.) by analogy, without departing from the scope of the present disclosure.

The example UI diagram of FIG. 4 shows an example UI enabled by the conversational analytics system that supports a conversational (or chat-based) user interface where users can ask a sequence of questions as part of a conversational thread. In this example, a user (e.g., 'Shristi') may converse or otherwise communicate with a bot (e.g., 'qbo'). In some examples, the user and the bot may be examples of the conversational user and bot described with reference to FIGS. 1 and 3. As described herein, user input 400 (e.g., each NL query) from the user may interpreted into a sentence in the controlled natural language. The controlled NL query may then be converted into one or more SQL queries and sent to the database. The answers to the queries may then be combined and presented back to the user as bot output 405 (e.g., as a combination of charts and text). In case of any ambiguity in the translation from natural language to the controlled natural language, 'qbo' may present possible interpretations of the query (e.g., via bot output 405) and asks the user to pick a query (e.g., via user input 400). The user can also pose subsequent questions that drill-down into the answers to previous questions. In some cases, the conversational analytics system may interpret each question in the context of previous questions.

For instance, in the example of FIG. 4, example user input 400-a may include a natural language question or expression. The corresponding example bot output 405-a may indicate that the bot understands the question and the example bot output 405-a may include translation of the question or expression into controlled natural language form in order to confirm the bot understanding of example user input 400-a. In some cases, the example bot output 405-a may further include the results of the NL query of example user input 400-a. That is, in cases where the bot understands example user input 400-a and is able to translate the NL query into SQL, the example bot output 405-a may display results of the SQL query executed by the database.

In some examples, example user input 400-b may try to drill down with an alternate search or a more specific search. Example bot output 405-b may provide options in controlled natural language in case of ambiguity (e.g., the options based on example user input 400-b and potential correspondence in the controlled NL queries). Example user input 400-c may then include a selection or confirmation of controlled natural language options presented in example bot output 405-b. Accordingly, example bot output 405-c may, in some cases, include some indication that the example user input 40-c is understood. Generally, a conversational analytics system (e.g., the bot, the conversational analytics system, the query processor, etc.) may formulate the resulting expression (e.g., determined based on user input 400-c) in controlled natural language form, query the database, and bot output 405-*c* may then output (e.g., display) the results (e.g., automatically in an appropriate chart type).

Figure 5:
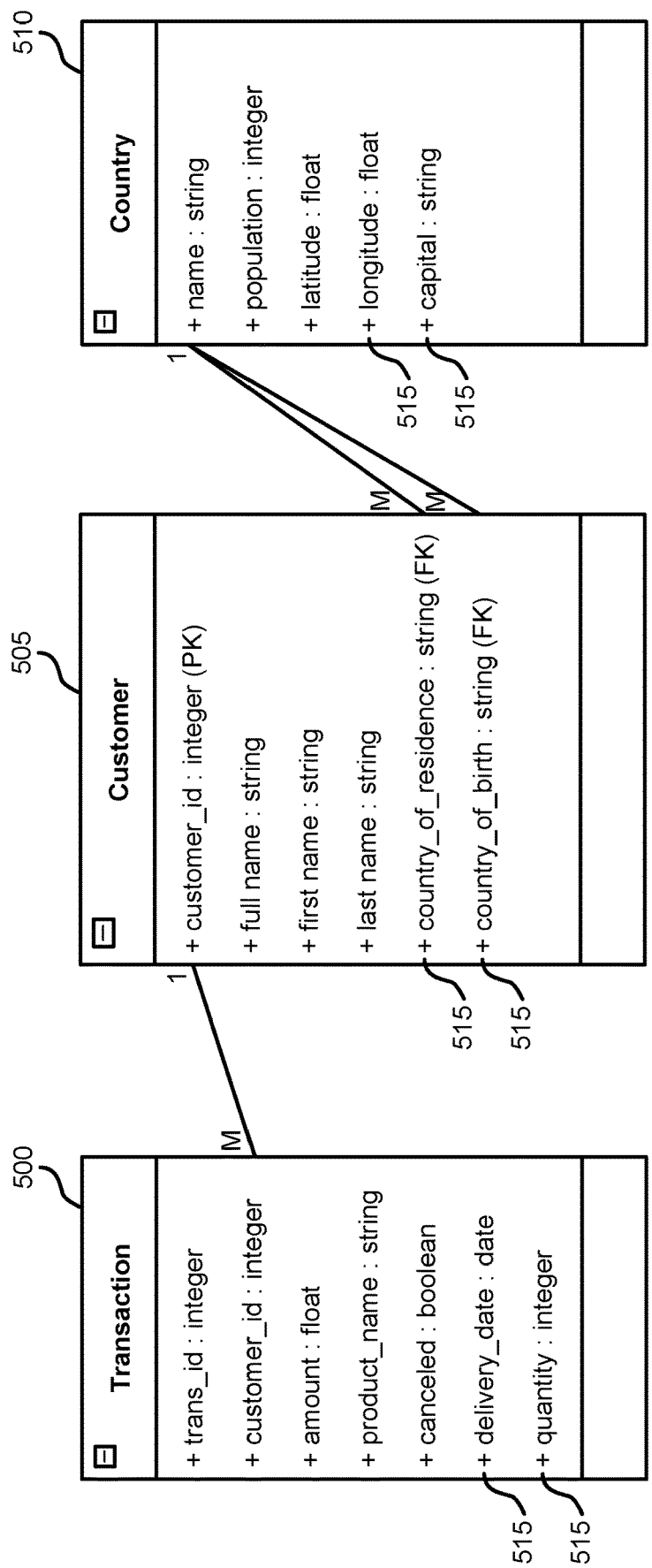
FIG. 5 shows an example of schema diagram according to aspects of the present disclosure.

FIG. 5 shows an example of schema diagram according to aspects of the present disclosure. The example shown includes transaction entity 500, customer entity 505, and country entity 510. Transaction entity 500 may be an example of, or includes aspects of, the corresponding element described with reference to FIG. 2. In one embodiment, transaction entity 500, customer entity 505, and country entity 510 may each include various attribute fields 515. Attribute fields 515 may be examples of, or include aspects of, the corresponding element described with reference to FIG. 2 (e.g., attribute fields 515 of transaction entity 500 may be examples of, or include aspects of, the corresponding elements of transaction entity 200 described with reference to FIG. 2).

In an example schema (e.g., illustrated by one or more aspects of FIG. 5), there may entities such as transaction entity 500, customer entity 505, and country entity 510. Each transaction is associated with a customer, though a single customer may have multiple transactions. Each customer may be associated with one or more countries such as a country of residence relationship or a country of birth relationship, but the present disclosure is not limited thereto. The relationship between a transaction and a customer may be referred to as "referenced entity" to refer to the customer entity 505 and "referencing entity" to refer to the transaction entity 500.

Figure 6:
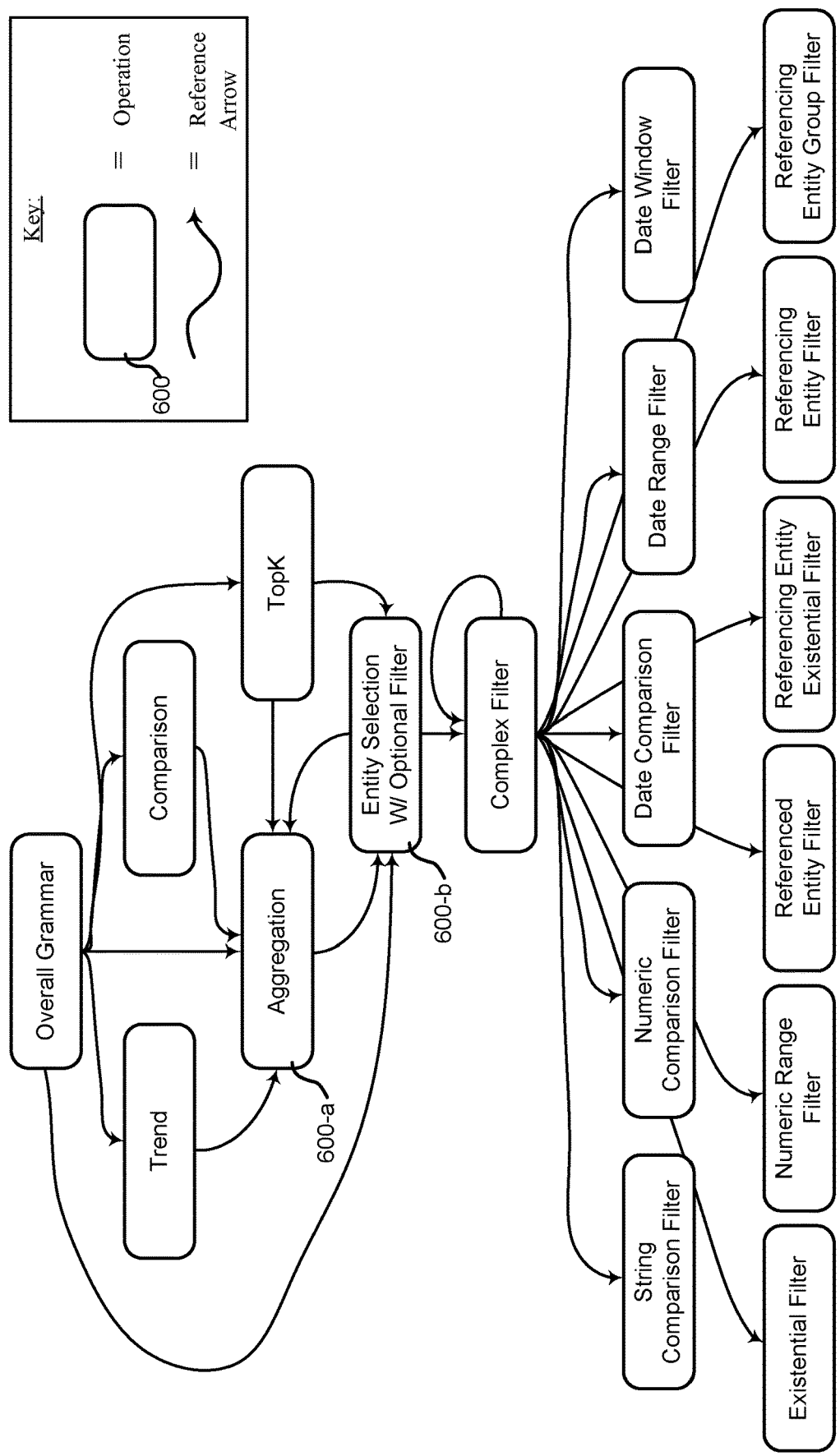
FIG. 6 shows an example of an operation diagram according to aspects of the present disclosure.

FIG. 6 shows an example of an operation diagram according to aspects of the present disclosure. For instance, FIG. 6 may illustrate various operations 600. One or more aspects of the present disclosure may include performing various operations 600 such as filtering, aggregating, selecting (e.g., entity selection with optional filter), Top-k (e.g., TopK), trending, comparing, etc. FIG. 6 may illustrate an example of how several operations 600 can be composed. Each arrow (e.g., each reference arrow) from an operation A to an operation B represents the presence of an exit non-terminal in the base CFG from the recognizer of operation A referring to an entry non-terminal in the base CFG from the recognizer for operation B. For example, the Aggregation operation 600-*a* can refer to the Entity Selection operation 600-*b*. The Entity Selection operation 600-*b* can also refer to the Aggregation operation 600-*a*, for example, to support questions such as "customers with total amount of the transactions over 1000". The Entity Selection operation 600-*b* may include a numeric filter on an aggregation of an attribute.

In filtering, in some examples of the present disclosure, a single filter may be performed on an entity based on the value(s) of an attribute in the same entity or another related entity. In aggregating, in some examples of the present disclosure, one or more aggregations may be performed on an entity (e.g., using attributes belonging to the same entity or another related entity, optionally with group-bys on one or more attributes of the same or related entity). In selecting, in some examples of the present disclosure, one or more attributes or aggregations may be selected to be to display for a given entity. In Top-k, in some examples of the present disclosure, the number of results returned may be limited (e.g., and in some cases the number of results may be optionally ordered by an attribute or an aggregation). In trending, in some examples of the present disclosure, an aggregation may be performed on a date or date-time attribute to produce a time series, in comparing, in some examples of the present disclosure, the value of an aggregation may be compared across two different filters.

In some examples, the filter operation may include a String Comparison Filter, a Date Comparison Filter, a Date Range Filter, a Date Window Filter, an Existential Filter, a Numeric Comparison Filter, a Numeric Range Filter, a Referenced Entity Filter, a Referencing Entity Existential Filter, a Referencing Entity Filter, a Referencing Entity Group Filter, and a Complex Filter. The String Comparison Filter may express comparison on a string attribute (e.g., such as "transactions with product name Apple" or "transactions with product name starting with "IPhone").

A Date Comparison Filter may express a comparison on a date or datetime attribute (e.g., such as "transactions with delivery date after Jan. 1, 2020"). A Date Range Filter may express a range filter on date or datetime attribute (e.g., such as "transactions with delivery date between Jan. 1, 2020 and Mar. 1, 2020"). A Date Window Filter may express a comparison on a relative window of time (e.g., such as "transactions with delivery date in the last 3 months").

An Existential Filter may express the existence of a (non-null) attribute value for an entity (e.g., such as "customers with a middle name"). A Numeric Comparison Filter may express a comparison on a numeric field (e.g., such as "countries with population greater than 10,000,000"). A Numeric Range Filter may express a range filter on a numeric filter (e.g., such as "transactions with amount between 10 and 100"). A Referenced Entity Filter may express a filter of some kind on an attribute of another referenced entity (e.g., such as "transactions made by a customer born in Canada"). Note that, in some cases, the actual kind of filter may depend on the data type of the attribute.

A Referencing Entity Existential Filter may express if there is a referencing entity associated with a given instance of the entity (e.g., such as "customers who have made at least one transaction"). A Referencing Entity Filter may express a filter on an attribute in a referencing entity (e.g., such as "customers that made a transaction with product name Apple"). A Referencing Entity Group Filter may express a filter on an aggregation on a referencing entity (e.g., such as "customers that have made at least 3 transactions"). In some examples, a Complex Filter may be made up of two filters with a conjunction or a disjunction in between.

Similarly, other operations such as aggregation and Top-k (TopK) may be broken down into various kinds. Note that the above-mentioned kinds of operations are not exhaustive and are meant to give an idea of the various kinds of operation that can be implemented on a relational database schema.

Each operation may be associated with a recognizer. In a CFG, the entry non-terminal may be Agg_transaction and the exit non-terminal may be SelectionWithOptionalFilters_trans. The exit non-terminal provides an aggregation operation that may be composed with a selection operation that provides defining zero or more filters on the transaction entity.

In some examples, operations may be defined in a recursively composable manner. For example, a Complex Filter may combine multiple filters using conjunctions (ANDs) or disjunctions (ORs). A string filter and a numeric comparison filter may be combined to ask, for example, "what are the transactions with product name Apple and with amount greater than 100." Then, an aggregation may be composed with the multiple filter recognizers to produce a query that performs an aggregation on an entity filtered based on multiple attributes. For example, "what is the maximum quantity of the transactions with product name Apple and with amount greater than 100," may be asked. Then, a top-k operation (TopK) can be further composed to produce a list of records ordered by the aggregation on an entity filtered based on multiple attributes. For example, "who are the top 5 customers in order of the maximum quantity of their transactions with product name Apple and with amount greater than 100" may be asked.

As a result, the controlled natural language may express queries of increasing complexity and can express a potentially infinite number of queries by combining different operations on different attributes in various entities in different orders. The recursive composition of operations is achieved through the composition of the CFGs generated by the recognizers using the exit and entry non-terminals.

There is an overall grammar recognizer which refers to several other recognizers to build out the overall grammar for the conversational analytics system. For example, a question to the conversational analytics system can be a trend query or an aggregation query, a top-k query, a comparison query, or a selection query with optional filters.

Different recognizers may be distinguished from each other to generate the CFG. One recognizer may operate on a single entity such as a string comparison filter on each string attribute of the entity. Attributes or entities may be parameterized by the name of the entity, the data type of the attribute, and/or any other semantic information about the entity and the attribute. Another recognizer, such as a referenced entity filter, may operate on a relationship between entities. The relationships may be parameterized by the names of the entities, the relationship between the entities, the attributes that may be involved in the relationship between the entities, and other semantic information about the entities and attributes.

Another aspect of the CFG may involve values of attributes that can be used as part of filters. Values of attributes may be used to support queries such as "what are the transactions with product name Apple." Hence, for string attributes, unique values of the attributes may be fetched from the database and may be included in the grammar as part of the string comparison filter recognizers.

In an example scenario, the following are steps for generating the CFG. Variable Z1 is the set of single entity recognizers. Variable Z2 is the set of relation recognizers. Variable E is the set of entities in querybot ER model. Variable A(e) is the set of attributes in entity e, where e belongs to E. Variable R is the set of relations in the querybot ER model. Start with an empty grammar G. For each entity e in the Querybot ER Model that contains a set of attributes A(e), and for each single entity recognizer z, grammar snippet g is generated for z(e, A(e)). If z is a string filter recognizer, specific values V of the attribute a from the database are obtained. Specific values V are included in g. Variable g is then added to G. For each relation r between e1 and e2, based on attributes a1 and a2 in the Querybot ER Model and for each relational recognizer z, grammar snippet g is generated for z(r, e1, e2, a1, a2). Variable g is then added to G and G is returned.

One or more aspects of the techniques described herein may be implemented to handle CFG refinements. For instance, each recognizer may be associated with a refinement CFG that details possible ways of building on a previous query. For example, a possible chain of queries from a user may be "what are the transactions with product name Apple and with amount greater than 100." The user may then query "refine and show the maximum quantity of these transactions," meaning "what is the maximum quantity of the transactions with product name Apple and with amount greater than 100." The user may finally query "refine and show monthly," meaning "what is the maximum quantity of the transactions with product name Apple and with amount greater than 100 for each month." Each subsequent query can build on the previous query and may result in the addition or deletion of various parts of a query.

The process of generating an actual refinement CFG for each recognizer may be similar to one or more aspects of producing the base CFG and depends on the querybot ER model of the database and possible values that various columns can receive. One or more refinement CFGs may be produced for each recognizer and each top level entity. For example, if there are six classes of recognizers, then, there may be 19 CFGs that form the controlled natural language with one base grammar and eighteen refinement grammars.

At any point of time, during query processing, at most one of the refinement CFGs is "active". The active refinement CFG may depend on the entity and the top-level operation used in the previous query made by the user. The active refinement CFG determines what kind of refinements are possible at any point in the conversation. For example, a query "what is the number of transactions" presents a top-level operation that may be an aggregation and is on the transaction entity. As a result, the active refinement CFG after this query may support a query such as "refine and show those with product Apple," which may add a filter to the aggregation query.

Additionally, or alternatively, a query such as "who are the customers with age greater than 10" uses a selection recognizer and the customer entity. The refinement grammar for this query may include a query such as "refine and show the top 5," which may add a top-k sorting and filtering to the original selection query. The result is that the controlled natural language may be described by a set of CFGs, where the set of CFDs may contain a base CFG and a refinement CFG for each entity in the database and each broad class of recognizer. In some examples, a rule where there is no overlap between the base grammar and any of the refinement grammars may be implemented. As a result, ambiguity as to whether any user query should be interpreted as a new query or as something that builds upon a previous query may be reduced.

A query processor (e.g., query processor 120 and/or query processor 330) may use a user utterance following a controlled natural language and return results of the query to the end-user. The query may be parsed based on the CFGs that form the controlled natural language and the parameters of the query are extracted. The parameters may then be used to create a SQL based on information from the database. The database is queried, the results fetched, and the appropriate charts and/or text are prepared for the user.

The grammar builder (e.g., grammar builder 150 and/or grammar builder 360) may construct a set of CFGs that represents the controlled natural language. The query parser (e.g., query parser 145 and/or query parser 355) may use CFGs to parse a controlled NL query string from the user. At any point in the conversation flow, a user may pose a new query or add to a previous query (e.g., which may be a refinement query). The new query may be a valid sentence according to the base grammar. A refinement query may be a valid sentence according to one of the refinement grammars.

The first step in parsing the query string is tokenization. Tokenization may be a breakup of the query string into one or more tokens. A multi-word tokenization strategy may split the query string based on a set of delimiters like common punctuations and marge multi-word expressions into single tokens, using a lexicon of multi-word expressions. These multi-word expressions include terminals in the CFGs (e.g. "total number").

After tokenization, a parse tree may be generated, depending on active CFGs. A Query Parser (e.g., query parser 145 and/or query parser 355) may maintain the state of the conversation with the end-user and keep track of previous queries. Based on the previous query, a refinement grammar may be active and used for parsing. Hence, when a user query is created, the Query Parser may determine if the query is from the base grammar or the currently active refinement grammar and generate a parse tree. Then, the parse tree may be examined to create a logical query with a set of parameters that may be used to generate a SQL.

Figure 7:
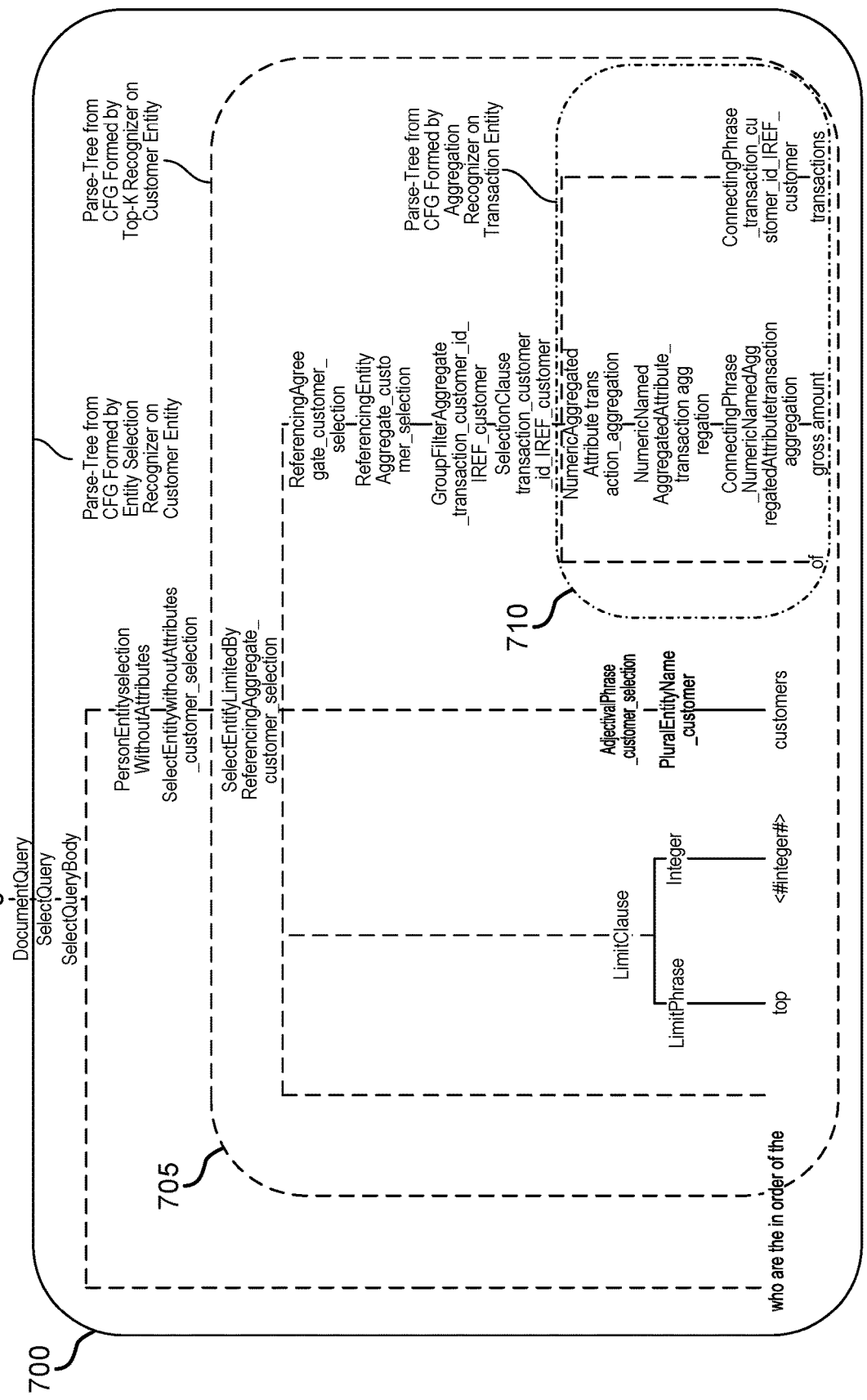
FIG. 7 shows an example of a parse tree diagram according to aspects of the present disclosure.

FIG. 7 shows an example of a parse tree diagram according to aspects of the present disclosure. For instance, the example parse tree diagram of FIG. 7 may illustrate an example of a parse tree for an example query: "what are the top 3 customers in order of the gross amount of transactions." Specifically, FIG. 7 may illustrate parse tree 700, parse tree 705, and parse tree 710. In the present example, parse tree 700 may be generated from CFG formed by entity selection recognizer on customer entity, parse tree 705 may be generated form CFG formed by Top-K (TopK) recognizer on customer entity, and parse tree 710 may be generated from CFG formed by aggregation recognizer on transaction entity.

The example query "what are the top 3 customers in order of the gross amount of transactions" matches the CFG formed by the Entity Selection Recognizer on the Customer entity. However, the query may include sub-expressions that may be matched by the CFG fragments from other recognizers. The sub-expression "top 3 customers in order of the gross amount of transactions" may be matched by the CFG fragment formed by the top-k (TopK) recognizer on the customer entity and further contains a sub-expression "gross amount of transactions" that is matched by the CFG fragment produced by the Aggregation recognizer on the transaction entity.

In some cases, the CFG may be ambiguous, where the same sentence may result in different parse trees. A set of prioritization rules may be used to handle the ambiguities. Additionally, or alternatively, in some cases, trees with shortest depth may be used. Among those trees, in some cases, the left-most derivation tree may be used.

Each recognizer may be associated with logic to decipher a phrase that follows a CFG and extracts relevant parameters used to construct a logical query. For example, the aggregation recognizer from the transaction entity looks at the portions of the parse tree headed by Agg_Attributes_transaction, NumericNamedAggregatedAttribute_transaction_aggregation and GroupByClause_transaction to figure out what are the aggregations and group-bys to use in the query. In an example scenario, an aggregation recognizer parses a sub-query such as "gross amount of transactions" and extracts parameters "gross amount" and "transactions". Parameter "gross amount" is a named aggregate or metric defined in the querybot ER model as the sum of amount. Parameter "transactions" may refer to the entity on which the metric is operating on. Further, a top-k (TopK) recognizer may parse the sub-query string "top 3 customers in order of the gross amount of transactions" and extracts parameters "top", "3", and "gross amount of transactions". The recognizers may extract the parameters to form the final SQL query.

One or more aspects of the techniques described herein may be implemented for SQL generation. Conversational analytics systems may have different databases supporting different variants of SQL. Pluggable modules may be used for different databases supporting different variants of SQL. The pluggable modules receive a logical query with a set of parameters and create a specific SQL for a certain database. For example, there are different modules for supporting MySQL, Oracle, SQL Server, Impala, etc.

For example, a parse tree with three recognizers that extracted different parameters from the query "what are the top 3 customers in order of the gross amount of transactions" may result in a SQL query such as:

SQL Query 1

```
SELECT DISTINCT customer.first_name AS "first name", customer.id AS id,
customer.last_name AS "last name", anon_1."gross amount" AS "gross amount (transaction)"
FROM customer LEFT OUTER JOIN
    (SELECT anon_2."customer id" AS "customer id", sum(anon_2.amount) AS "gross
amount" FROM
        (SELECT transaction.amount AS amount, transaction.customer_id AS "customer id"
FROM transaction) AS anon_2
      GROUP BY anon_2."customer id") AS anon_1
      ON customer.id = anon_1."customer id"
ORDER BY "gross amount (transaction)" DESC, customer.id DESC
LIMIT 3
```

One or more aspects of the techniques described herein may be implemented for querying the database. The Database Querier component (e.g., DB querier 135 and/or DB querier 345) may maintain a connection with the database (e.g., DB 170 and/or DB 380) with credentials supplied during installation or configuration of the conversational analytics system. The Database Querier component may take an SQL query generated in the previous step (e.g., a SQL query generated by SQL generator 140 and/or SQL generator 350), and the Database Querier component may send the SQL query to the database. In some examples, the Database Querier component may impose some configurable limits on the results (e.g., to not overwhelm the conversational analytics system with an overwhelming amount of results).

One or more aspects of the techniques described herein may be implemented for result post-processing. For instance, in some cases, the results (e.g., queried results from a database) may be modified for a more presentable presentation the end-user. Operations may be used, such as handling errors, handling NULL values by replacing the NULL values with some defaults, substituting table and column names in the results with user-friendly entity and attribute names as specified in the logical querybot ER model, substituting values by any substitutions as defined in the logical querybot ER model, and/or applying additional analytics to the results. Operations such as time-series forecasting, anomaly detection, and variance analysis, may be used, but the present disclosure is not limited thereto.

In some examples, the results of the query may then be converted into output (e.g., into charts, text, or other widgets for display to the end-user). In some cases, conversion into charts, text, and other widgets may be performed using a rule-based approach. Rules may be used to pick the right chart type given the data. For example, if an attribute in the results data is a location, or there is a latitude and a longitude field, then a map type may be displayed. Additionally, or alternatively, rules may be used to generate a natural language explanation of the results. This uses template natural language sentences that get filled in depending on the values in the results.

One or more aspects of the techniques described herein may be implemented for autocompletions. For instance, the controlled natural language CFGs may also facilitate autocompletions in the user interface. The user can type queries in a text box in the chat interface. In some examples, autocompletions may be generated based on the text typed by the user so far, as long as the text is a valid prefix to a valid query as accepted by the active CFGs. The user may type a question accepted by the base CFG or one of the refinement CFGs.

For example, if a user begins typing "total", the conversational analytics systems may present a number of autocompletion options, such as amount, number, quantity, number of transactions, number of unique values to the user in a drop-up or drop-down menu, etc. Furthermore, if the user starts typing "nu" meaning the current input is "total nu", the autocompletions ' . . . mber of the transactions' or ' . . . mber of unique values' may appear.

Generating the autocompletions of the present disclosure may include tokenizing the string entered so far using the multi-word tokenizer described earlier and/or parsing the string based on the CFGs to consume the input tokens. A variety of parsing strategies can be used. For example, Earley's algorithm may be used. Earley's algorithm may include a top-down dynamic programming based parsing algorithm. After consuming the last token, Earley's algorithm may reach a state represented by a tuple $(X \rightarrow \alpha \cdot \beta, i)$, with the production matched with $(X \rightarrow \alpha\ \beta)$, the position in the production, and the position i in the input at which the matching of this production began may be the origin position.

The matched production may be used to generate next possible tokens based on the grammar. If the final token in the user string is part of the lexicon, the autocompletions may include the next token(s). If the final token is not part of the lexicon, then it can be a partial token. Therefore, the autocompletions may include the completion of the final token to create a valid string in the lexicon followed by the next tokens.

Figure 8:
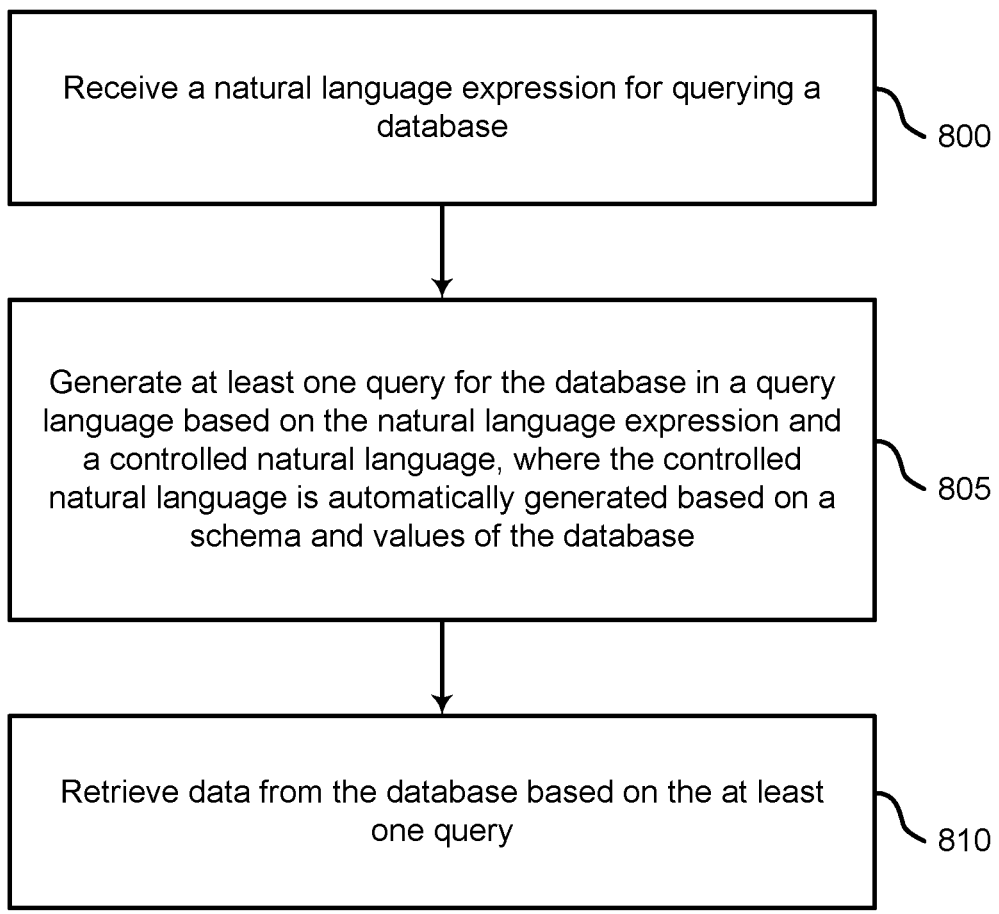
FIGS. 8 through 10 show examples of a process for relational database operation according to aspects of the present disclosure.

FIG. 8 shows an example of a process for relational database operation according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some cases, some of the operations described herein may be performed at the same time or in a different order.

At operation 800, the system receives a natural language expression for querying a database. In some cases, the operations of this step refer to, or be performed by, an NLU engine as described with reference to FIGS. 1 and 3.

At operation 805, the system generates at least one query for the database in a query language based on the natural language expression and a controlled natural language, where the controlled natural language is automatically generated based on a schema and values of the database. In some cases, the operations of this step refer to, or be performed by, a query processor as described with reference to FIGS. 1 and 3.

At operation 810, the system retrieves data from the database based on the at least one query. In some cases, the operations of this step refer to, or be performed by, a query processor as described with reference to FIGS. 1 and 3.

Figure 9:
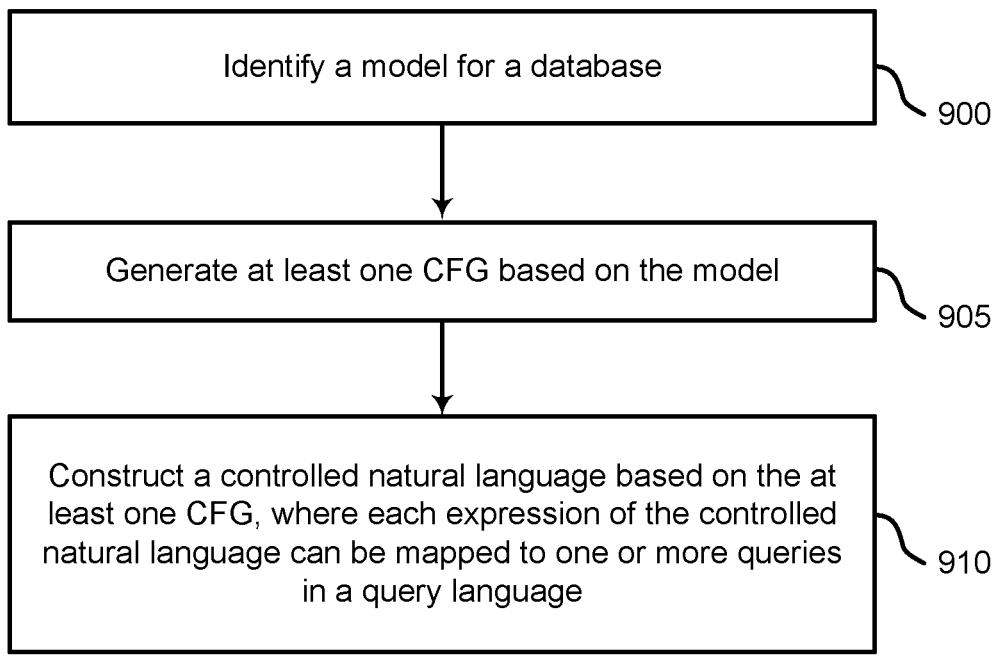

FIG. 9 shows an example of a process for relational database operation according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some cases, some of the operations described herein may be performed at the same time or in a different order.

At operation 900, the system identifies a model for a database. In some cases, the operations of this step refer to, or be performed by, a grammar builder as described with reference to FIGS. 1 and 3.

At operation 905, the system generates at least one CFG based on the model. In some cases, the operations of this step refer to, or be performed by, a grammar builder as described with reference to FIGS. 1 and 3.

At operation 910, the system constructs a controlled natural language based on the at least one CFG, where each expression of the controlled natural language can be mapped to a sequence of one or more queries in a query language. In some cases, the operations of this step refer to, or be performed by, a query processor as described with reference to FIGS. 1 and 3.

Figure 10:
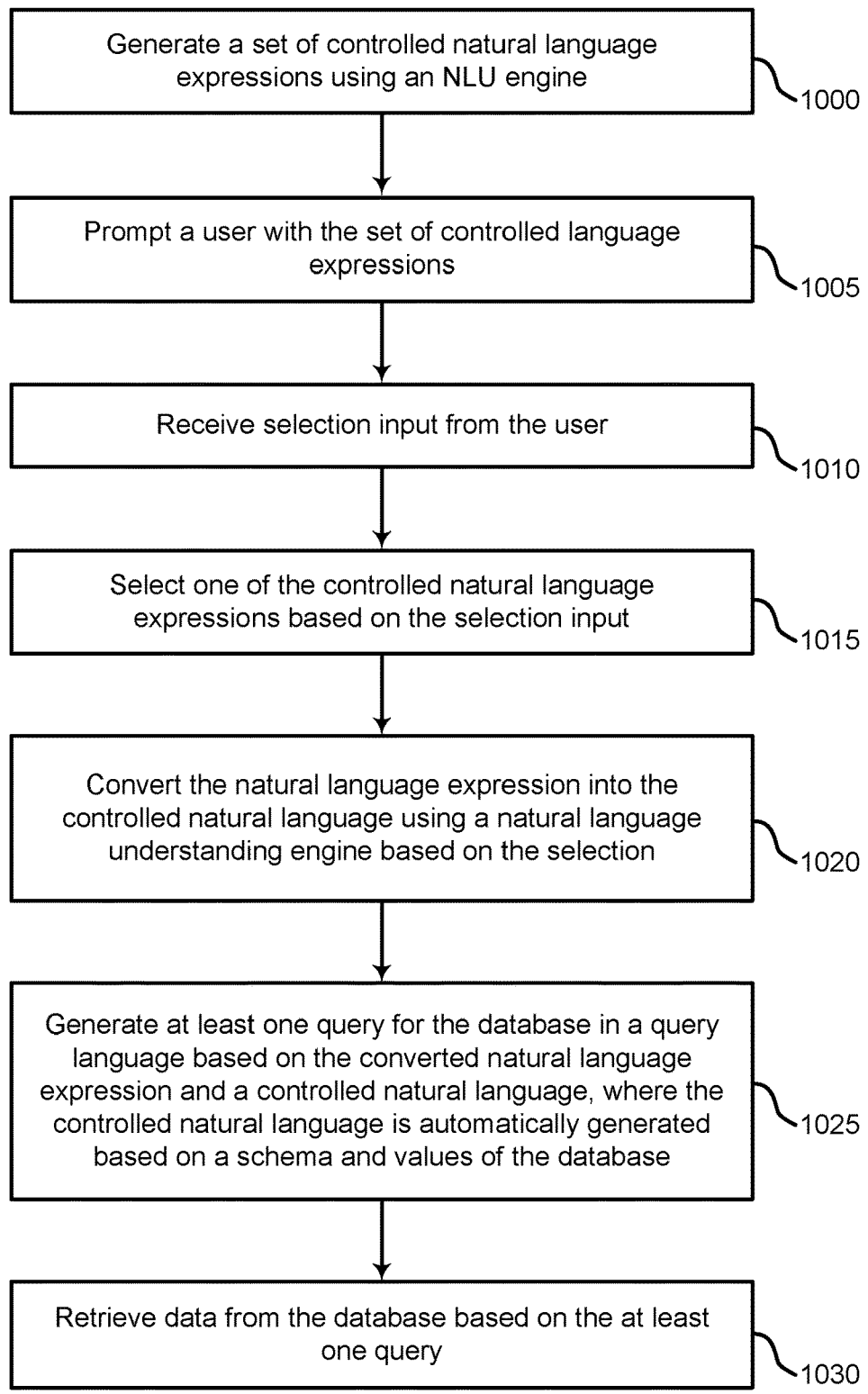

FIG. 10 shows an example of a process for relational database operation according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations. In some cases, some of the operations described herein may be performed at the same time or in a different order.

At operation 1000, the system generates a set of controlled natural language expressions using the NLU engine. In some cases, the operations of this step refer to, or be performed by, an NLU engine as described with reference to FIGS. 1 and 3. For example, the system may receive a natural language expression, and generate a set of controlled natural language expressions using the NLU engine to help the user select a controlled natural language expression matching the intent of the original expression.

At operation 1005, the system prompts a user with the set of controlled language expressions. In some cases, the operations of this step refer to, or be performed by, a dialog manager as described with reference to FIGS. 1 and 3.

At operation 1010, the system receives selection input from the user. In some cases, the operations of this step refer to, or be performed by, a dialog manager as described with reference to FIGS. 1 and 3.

At operation 1015, the system selects one of the controlled natural language expressions based on the selection input. In some cases, the operations of this step refer to, or be performed by, an NLU engine as described with reference to FIGS. 1 and 3.

At operation 1020, the system converts the natural language expression into the controlled natural language using a natural language understanding engine based on the selection. In some cases, the operations of this step refer to, or be performed by, an NLU engine as described with reference to FIGS. 1 and 3.

At operation 1025, the system generates at least one query for the database in a query language based on the converted natural language expression and a controlled natural language, where the controlled natural language is automatically generated based on a schema and values of the database. In some cases, the operations of this step refer to, or be performed by, a query processor as described with reference to FIGS. 1 and 3.

At operation 1030, the system retrieves data from the database based on the at least one query. In some cases, the operations of this step refer to, or be performed by, a query processor as described with reference to FIGS. 1 and 3. In some cases, the system may perform post-processing or chart/text generation based on the retrieved data. For example, a chart illustrating the data may be provided to the user who made the query to answer a question in a visual format. Additionally or alternatively, the data from the database may be converted into a natural language response to the query.

Accordingly, the present disclosure includes the following embodiments.

A method for relational database operation is described. Embodiments of the method include receiving a natural language expression for querying a database, generating at least one query for the database in a query language based on the natural language expression and a controlled natural language, wherein the controlled natural language is automatically generated based on a schema and values of the database, and retrieving data from the database based on the at least one query.

An apparatus for relational database operation is described. The apparatus includes a processor, memory in electronic communication with the processor, and instructions stored in the memory. The instructions are operable to cause the processor to receiving a natural language expression for querying a database, generating at least one query for the database in a query language based on the natural language expression and a controlled natural language, wherein the controlled natural language is automatically generated based on a schema and values of the database, and retrieving data from the database based on the at least one query.

A non-transitory computer readable medium storing code for relational database operation is described. In some examples, the code comprises instructions executable by a processor to: receiving a natural language expression for querying a database, generating at least one query for the database in a query language based on the natural language expression and a controlled natural language, wherein the controlled natural language is automatically generated based on a schema and values of the database, and retrieving data from the database based on the at least one query.

Some examples of the method, apparatus, and non-transitory computer readable medium described above further include converting the natural language expression into the controlled natural language using a natural language understanding engine, wherein the at least one query is generated based on the converted natural language expression. Some examples of the method, apparatus, and non-transitory computer readable medium described above further include generating a plurality of controlled natural language expressions using the NLU engine, Some examples further include selecting one of the controlled natural language expressions, wherein converting the natural language expression is based on the selection. Some examples of the method, apparatus, and non-transitory computer readable medium described above further include prompting a user with the plurality of controlled language expressions. Some examples further include receiving selection input from the user, wherein the selection is based on the selection input.

In some examples, every expression in the controlled natural language is uniquely and unambiguously convertible to a sequence of valid queries in the query language. Some examples of the method, apparatus, and non-transitory computer readable medium described above further include identifying a prior query to the database, wherein the natural language expression is converted based at least in part based on the prior query.

Some examples of the method, apparatus, and non-transitory computer readable medium described above further include receiving audio information. Some examples further include converting the audio information into the natural language expression using a speech-to-text converter. Some examples of the method, apparatus, and non-transitory computer readable medium described above further include generating at least one CFG based on the schema. Some examples further include constructing the controlled natural language based on the at least one CFG, wherein each expression of the controlled natural language can be mapped to a sequence of one or more queries in a query language.

Some examples of the method, apparatus, and non-transitory computer readable medium described above further include transmitting the at least one query to the database, wherein the data is retrieved in response to transmitting the query. Some examples of the method, apparatus, and non-transitory computer readable medium described above further include displaying at least a portion of the data using a graphical representation, natural language text, audible information, or any combination thereof. Some examples of the method, apparatus, and non-transitory computer readable medium described above further include responding to the natural language expression based on the data using a chatbot application.

In some examples, the database comprises a relational database and the query language comprises a SQL query. Some examples of the method, apparatus, and non-transitory computer readable medium described above further include receiving a partial natural language expression. Some examples further include providing an autocomplete suggestion based on the partial natural language expression and the controlled natural language, wherein the natural language expression is based on the autocomplete suggestion.

A method for relational database operation is described. Embodiments of the method include identifying a model for a database, generating at least one CFG based on the model, and constructing a controlled natural language based on the at least one CFG, wherein each expression of the controlled natural language can be mapped to a sequence of one or more queries in a query language.

An apparatus for relational database operation is described. The apparatus includes a processor, memory in electronic communication with the processor, and instructions stored in the memory. The instructions are operable to cause the processor to identifying a model for a database, generating at least one CFG based on the model, and constructing a controlled natural language based on the at least one CFG, wherein each expression of the controlled natural language can be mapped to a sequence of one or more queries in a query language.

A non-transitory computer readable medium storing code for relational database operation is described. In some examples, the code comprises instructions executable by a processor to: identify a model for a database, generate at least one CFG based on the model, and constructs a controlled natural language based on the at least one CFG, wherein each expression of the controlled natural language can be mapped to a sequence of one or more queries in a query language.

Some examples of the method, apparatus, and non-transitory computer readable medium described above further include identifying metadata for the database, wherein the metadata comprises a schema and a plurality of database attributes. Some examples further include extracting the model for the database based on the metadata. Some examples of the method, apparatus, and non-transitory computer readable medium described above further include identifying additional semantic information about the database. Some examples further include enhancing the model based on the additional semantic information, wherein the at least one CFG is generated based on the enhanced model. In some examples, the at least one CFG comprises a base CFG and a plurality of refinement CFGs, wherein the base CFG comprises a modular structure including a plurality of CFG fragments, and wherein each of the CFG fragments describes an operation, and is associated with parsing logic and one of the refinement CFGs. In some examples, each of the CFG fragments comprises a single entry non-terminal and zero or more exit non-terminals.

In some examples, the controlled natural language represents a plurality of operations including at least one operation from a set comprising a filter operation, an aggregation operation, a selection operation, a top K operation, a trend operation, and a comparison operation, wherein each of the operations is described by a base CFG fragment and is associated with a refinement CFG.

Some examples of the method, apparatus, and non-transitory computer readable medium described above further include identifying an empty CFG. Some examples further include identifying an ER model comprising a plurality of entities and a plurality of relations between the entities. Some examples further include generating an entity CFG fragment for each of the entities using an entity recognizer, wherein the entity CFG fragment comprises a CFG fragment corresponding to each operation on an entity. Some examples further include adding the entity CFG fragment to the grammar. Some examples further include generating a relation CFG fragment for each relation among the entities.

Some examples further include adding the relation CFG fragment to the grammar, wherein the at least one CFG is based on the empty CFG, one or more added entity CFG fragments, and one or more added relation CFG fragments.

Some examples of the method, apparatus, and non-transitory computer readable medium described above further include identifying a plurality of string values from the database, wherein the at least one CFG is generated based on the string values.

An apparatus for relational database operation is described. Embodiments of the apparatus include a grammar builder configured to construct a controlled natural language based on a database model, an NLU engine configured to generate a controlled natural language expression based on the controlled natural language, and a query processor configured to generate a query for the database based on the controlled natural language expression.

A system for relational database operation is described. The system includes a grammar builder configured to construct a controlled natural language based on a database model, an NLU engine configured to generate a controlled natural language expression based on the controlled natural language, and a query processor configured to generate a query for the database based on the controlled natural language expression.

In some examples, the grammar builder further comprises a metadata extractor configured to extract metadata for the database, a model builder configured to generate a model of the database based on the metadata, and a CFG generator configured to construct the controlled natural language based on the model.

In some examples, the query processor further comprises a query parser, a query generator, a database querier, and a result processor. Some examples of the apparatus and system described above further include a dialog manager configured to provide controlled natural language options from the NLU engine to a user, wherein the controlled natural language expression is generated based on a selection among the controlled natural language options.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine, A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of operating a database, the method comprising:
   receiving a natural language expression for querying a database;
   generating at least one query for the database in a query language based on the natural language expression and a controlled natural language, wherein the controlled natural language is automatically generated based on a schema and values of the database; and
   retrieving data from the database based on the at least one query.

2. The method of claim 1, further comprising:
   converting the natural language expression into the controlled natural language using a natural language understanding (NLU) engine, wherein the at least one query is generated based on the converted natural language expression.

3. The method of claim 2, further comprising:
   generating a plurality of controlled natural language expressions using the NLU engine; and
   selecting one of the controlled natural language expressions, wherein converting the natural language expression is based on the selection.

4. The method of claim 3, further comprising:
   prompting a user with the plurality of controlled natural language expressions; and
   receiving selection input from the user, wherein the selection is based on the selection input.

5. The method of claim 2, further comprising:
   identifying a prior query to the database, wherein the natural language expression is converted based at least in part on the prior query.

6. The method of claim 1, further comprising:
   receiving audio information; and
   converting the audio information into the natural language expression using a speech-to-text converter.

7. The method of claim 1, further comprising:
   generating at least one context free grammar (CFG) based on the schema; and
   constructing the controlled natural language based on the at least one CFG, wherein each expression of the controlled natural language can be mapped to a sequence of one or more queries in a query language.

8. The method of claim 1, wherein:
   every expression in the controlled natural language is uniquely and unambiguously convertible to a sequence of valid queries in the query language.

9. The method of claim 1, further comprising:
   receiving a partial natural language expression; and
   providing an autocomplete suggestion based on the partial natural language expression and the controlled natural language, wherein the natural language expression is based on the autocomplete suggestion.

10. The method of claim 1, further comprising:
    displaying at least a portion of the data using a graphical representation, natural language text, audible information, or any combination thereof.

11. A method of operating a database, the method comprising:
    identifying a model for a database;
    generating at least one context free grammar (CFG) based on the model; and
    constructing a controlled natural language based on the at least one CFG, wherein each expression of the controlled natural language can be mapped to a sequence of one or more queries in a query language.

12. The method of claim 11, further comprising:
    identifying metadata for the database, wherein the metadata comprises a schema and a plurality of database attributes; and
    extracting the model for the database based on the metadata.

13. The method of claim 12, further comprising:
    identifying additional semantic information about the database; and
    enhancing the model based on the additional semantic information, wherein the at least one CFG is generated based on the enhanced model.

14. The method of claim 11, wherein:
    the at least one CFG comprises a base CFG and a plurality of refinement CFGs, wherein the base CFG comprises a modular structure including a plurality of CFG fragments, and wherein each of the CFG fragments describes an operation, and is associated with parsing logic and one of the refinement CFGs.

15. The method of claim 11, wherein:
    the controlled natural language represents a plurality of operations including at least one operation from a set comprising a filter operation, an aggregation operation, a selection operation, a top K operation, a trend operation, and a comparison operation, wherein each of the operations is described by a base CFG fragment and is associated with a refinement CFG.

16. The method of claim 11, further comprising:
    identifying an empty CFG;

identifying an Entity-Relationship (ER) model comprising a plurality of entities and a plurality of relations between the entities;
generating an entity CFG fragment for each of the entities using an entity recognizer, wherein the entity CFG fragment comprises a CFG fragment corresponding to each operation on an entity;
adding the entity CFG fragment to the grammar;
generating a relation CFG fragment for each relation among the entities; and
adding the relation CFG fragment to the grammar, wherein the at least one CFG is based on the empty CFG, the added entity CFG fragment, and the added relation CFG fragment.

17. An apparatus for operating a database, the apparatus comprising:
a grammar builder configured to construct a controlled natural language based on a database model;
a natural language understanding (NLU) engine configured to generate a controlled natural language expression based on the controlled natural language; and
a query processor configured to generate a query for the database based on the controlled natural language expression.

18. The apparatus of claim 17, wherein:
the grammar builder further comprises a metadata extractor configured to extract metadata for the database, a model builder configured to generate a model of the database based on the metadata, and a context free grammar (CFG) generator configured to construct the controlled natural language based on the model.

19. The apparatus of claim 17, wherein:
the query processor further comprises a query parser, a query generator, a database querier, and a result processor.

20. The apparatus of claim 17, further comprising:
a dialog manager configured to provide controlled natural language options from the NLU engine to a user, wherein the controlled natural language expression is generated based on a selection among the controlled natural language options.

\* \* \* \* \*